United States Patent
Billiotte et al.

(10) Patent No.: US 7,198,660 B2
(45) Date of Patent: Apr. 3, 2007

(54) ELECTROSTATIC DEVICE FOR IONIC AIR EMISSION

(75) Inventors: Jean-Marie Billiotte, London (GB); Alexandre Vladimirovitch Nagolkin, Moscow (RU); Frédéric Basset, London (GB); Elena Vladimirovna Volodina, Moscow (RU)

(73) Assignee: Airinspace Limited, Hamilton (BM)

( * ) Notice: Subject to any disclaimer, the term of this patent is extended or adjusted under 35 U.S.C. 154(b) by 281 days.

(21) Appl. No.: 10/450,565

(22) PCT Filed: Dec. 17, 2001

(86) PCT No.: PCT/FR01/04019

§ 371 (c)(1),
(2), (4) Date: Oct. 9, 2003

(87) PCT Pub. No.: WO02/49767

PCT Pub. Date: Jun. 27, 2002

(65) Prior Publication Data

US 2005/0098040 A1 May 12, 2005

(30) Foreign Application Priority Data

Dec. 18, 2000 (FR) ................................. 00 16607

(51) Int. Cl.
*B03C 3/41* (2006.01)
*B03C 3/45* (2006.01)
(52) U.S. Cl. .................... 96/66; 96/69; 96/70; 96/72; 96/77; 96/97; 96/98
(58) Field of Classification Search .............. 96/95–97, 96/65, 66, 70–72, 77, 98, 69; 55/DIG. 5, 55/DIG. 38
See application file for complete search history.

(56) References Cited

U.S. PATENT DOCUMENTS 1,767,338 A    6/1930   Arras ............................ 96/72

(Continued)

FOREIGN PATENT DOCUMENTS

BE         368 865         4/1930

(Continued)

*Primary Examiner*—Richard L. Chiesa
(74) *Attorney, Agent, or Firm*—Beyer Weaver & Thomas, LLP

(57) ABSTRACT

Ionic emission electrostatic device (1) for depositing on the surface (sp) of a multitude of aerosol particles (p1, p2, ..., pn) within a fluid (F), a quasi-homogeneous quantity of ions ($i^q$). This electrostatic device (1) is constituted by a conductive discharge corona electrode (EC) and a noncorona conductive receptor electrode (ER). The pseudo-planar active face (SA) of its receptor electrode (ER) is covered by a plurality of craters with sharp edges, in a closed pseudo circle, exhibiting on their end edges (Ai) a section of minimum bend radius, and enclosing the orifices (O1, O2, ..., On) and terminating towards the outside of the active face (SA). The craters are distributed quasi-uniformly on the active face (SA), in its two geometric directions. The surface flow of ions ($i^q$) originating from the corona electrode (EC) and in the direction of the active face of the receptor electrode (ER) has an increased homogeneity.

12 Claims, 11 Drawing Sheets

U.S. PATENT DOCUMENTS

| | | | | |
|---|---|---|---|---|
| 4,056,372 A | * | 11/1977 | Hayashi | 96/87 |
| 4,066,526 A | * | 1/1978 | Yeh | 204/554 |
| 4,313,739 A | * | 2/1982 | Douglas-Hamilton | 95/79 |
| 4,597,781 A | * | 7/1986 | Spector | 96/52 |
| 4,871,515 A | * | 10/1989 | Reichle et al. | 422/174 |
| 4,898,105 A | * | 2/1990 | Rappoldt et al. | 110/245 |
| 4,904,283 A | * | 2/1990 | Hovis et al. | 96/66 |
| 4,910,637 A | * | 3/1990 | Hanna | 361/229 |
| 4,920,266 A | * | 4/1990 | Reale | 250/324 |
| 4,979,364 A | * | 12/1990 | Fleck | 60/274 |
| 5,055,115 A | * | 10/1991 | Yikai et al. | 96/59 |
| 5,402,639 A | * | 4/1995 | Fleck | 60/275 |
| 5,474,600 A | * | 12/1995 | Volodina et al. | 96/57 |
| 5,622,543 A | * | 4/1997 | Yang | 96/58 |
| 5,695,549 A | * | 12/1997 | Feldman et al. | 96/55 |
| 5,814,135 A | * | 9/1998 | Weinberg | 96/58 |
| 5,922,111 A | * | 7/1999 | Omi et al. | 96/60 |
| 5,925,170 A | * | 7/1999 | Nojima | 96/71 |
| 5,951,742 A | * | 9/1999 | Thwaites et al. | 95/57 |
| 6,126,727 A | * | 10/2000 | Lo | 96/39 |
| 6,228,149 B1 | * | 5/2001 | Alenichev et al. | 95/78 |
| 6,312,507 B1 | * | 11/2001 | Taylor et al. | 96/19 |
| 6,506,238 B1 | * | 1/2003 | Endo | 96/79 |
| 6,585,803 B1 | * | 7/2003 | Chang et al. | 95/70 |
| 6,620,224 B1 | * | 9/2003 | Sato | 96/83 |
| 6,805,732 B1 | * | 10/2004 | Billiotte et al. | 96/66 |

FOREIGN PATENT DOCUMENTS

| | | | |
|---|---|---|---|
| EP | 0 425 433 A | 5/1991 | |
| JP | 4-110013 | * 4/1992 | 96/97 |

* cited by examiner

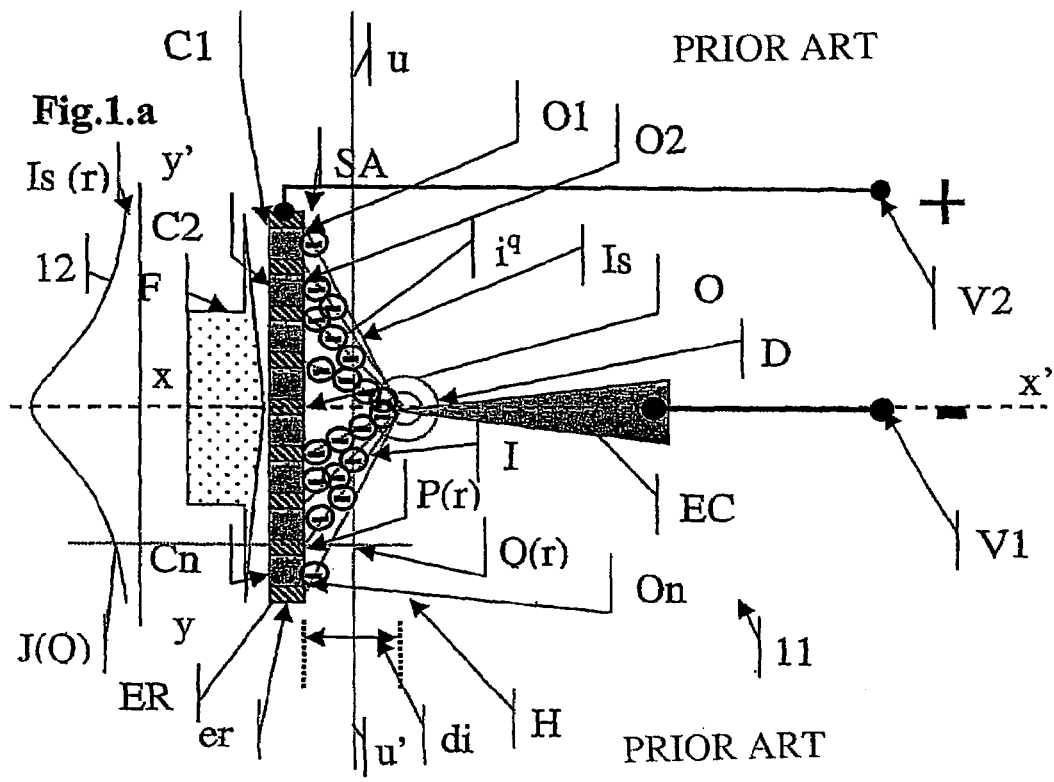
Fig.1.a PRIOR ART
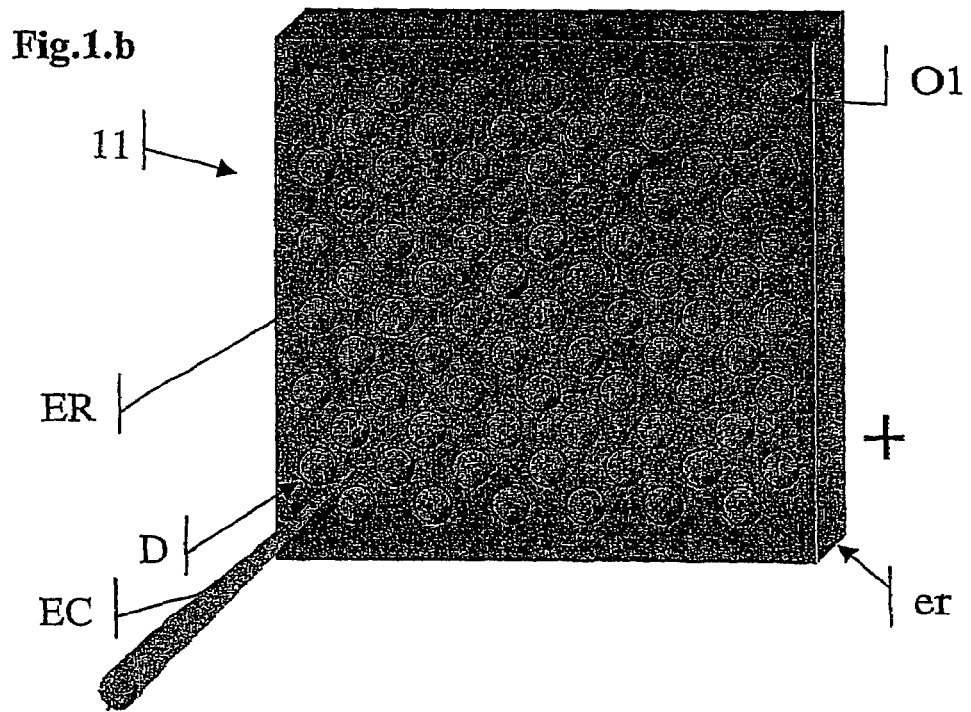
Fig.1.b PRIOR ART

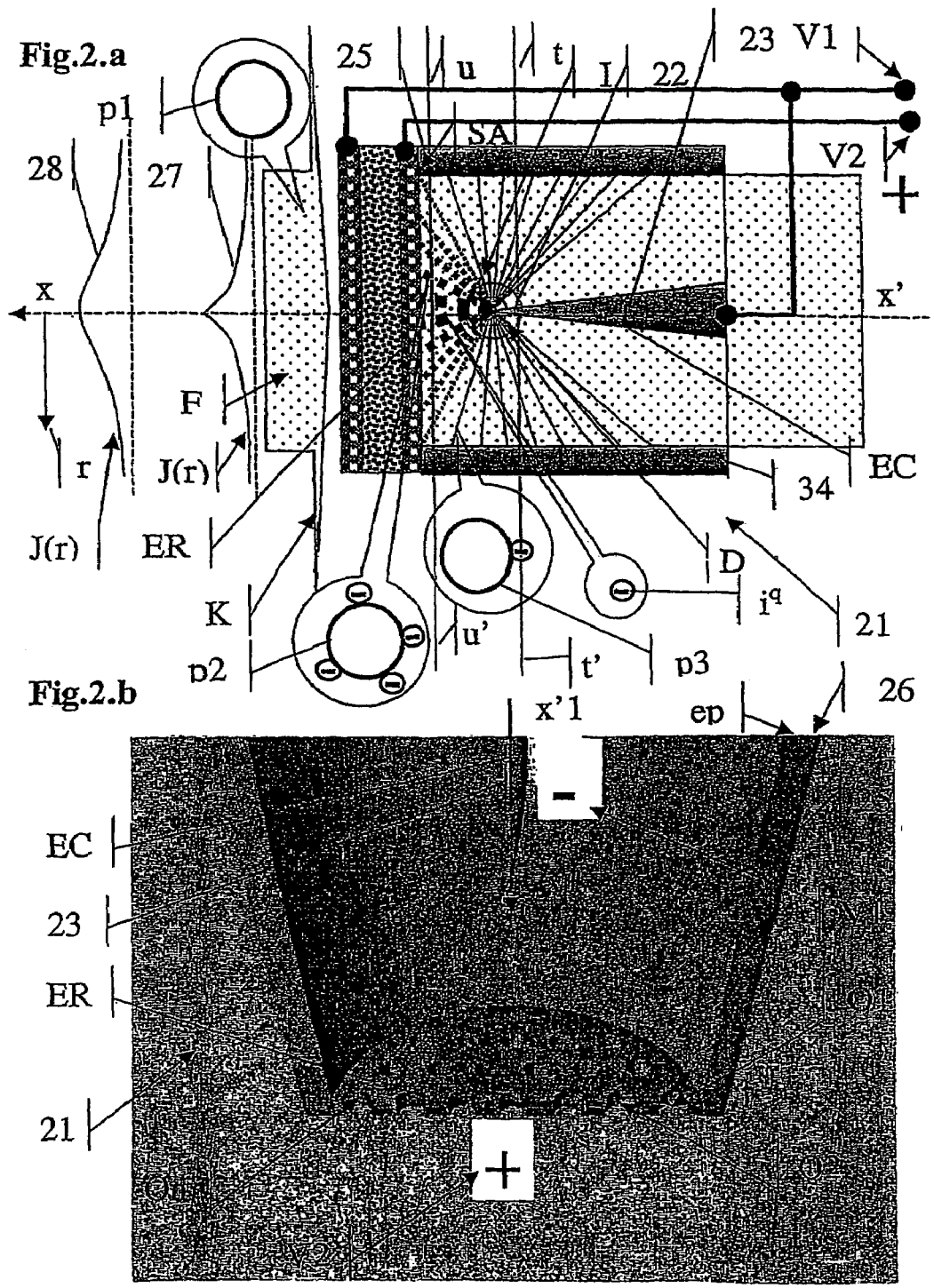

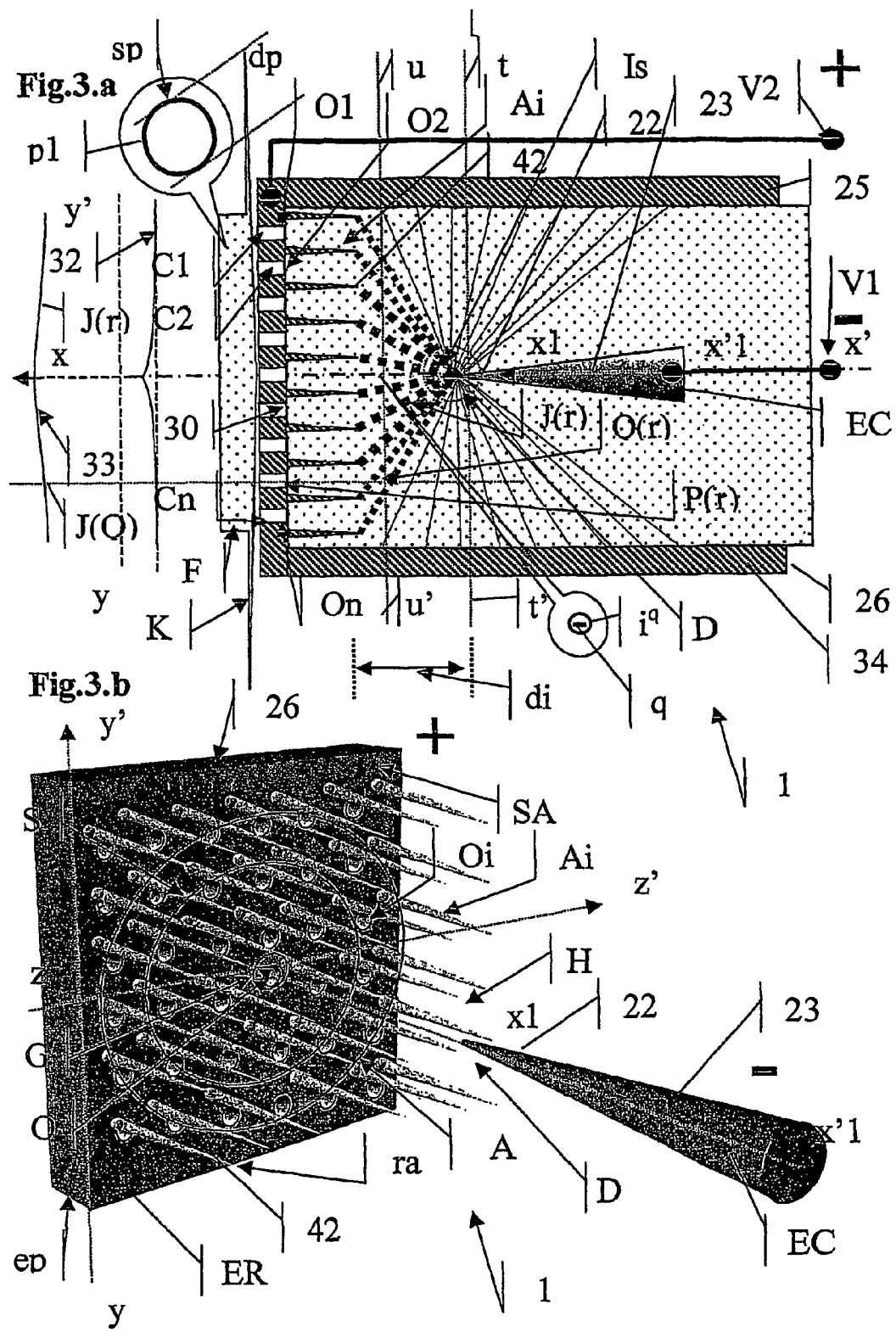
Fig.3.a
Fig.3.b

ELECTROSTATIC DEVICE FOR IONIC AIR EMISSION

The present application is the National Stage of International Application No. PCT/FR01/04019, filed on Dec. 17, 2001.

TECHNICAL FIELD OF THE INVENTION

The present invention relates to the technical field of electrostatic air conditioning devices, and more specifically to devices for submitting a multitude of aerosol particles (such as dust, bio-aerosols or specific molecules, . . . ) within a moving fluid to the action of an ionic flow originating from corona discharge electrode, with a view:

on the one hand to homogenising the flow of ions relative to the active plane face of a receptor electrode, and, on the other hand, to depositing on the surface of this multitude of aerosol particles (belonging to the same class of diameter) a quasi-homogeneous quantity of ions.

The aim of this homogenisation of the deposit of ions on the surface of the particles can be to impart mechanical, physical, chemical, energetic consequences of reduced intensity.

The invention relates to specifically to the technical field of electrostatic ionic emission and deposit devices of the type described hereinafter, constituted by the combination between—on the one hand, a discharge corona conductive electrode, subjected to an electric discharge potential, emitting an ion flow, —and on the other hand a porous non-corona conductive receptor electrode, subjected to a different potential, positioned relative to the corona electrode.

The invention further relates specifically to ionisation devices fitted with a porous non-corona conductive receptor electrode, presenting a pseudo-planar active face pierced with a multitude of fluid through channels. These channels traverse the receptor electrode and terminate in a multitude of orifices quasi-circular form, on an active face, according to the axis of flow of the fluid substantially perpendicular to the active face.

The invention also relates to ionisation devices which comprise means for pressurising fluid, ensuring movement of the fluid across the thickness of the electrode.

The invention finally relates to ionisation devices which are equipped with an electric current comprising at least two metallic terminals, having a fairly high electric potential difference between them (of the order of 5000V). At least two conductors are each connected—by one end to one of the two terminals de potential and/or to earth, —and by the other end respectively to a different terminal of the corona and receptor electrodes, such that the two electrodes (corona and receptor) are subjected to sufficient electric potential difference to ensure ionic emission in the discharge zone of the corona electrode.

The prior art knows the principle of electrostatic action devices by ionic flow on aerosol particles, utilising the arrangements mentioned hereinabove. The devices belonging to this technical field are currently mainly utilised for electrostatically filtering particles transported by an air flow.

But the prior art does not provide particular local geometric organisation of the active face of the receptor electrode, the effect of which is homogenisation of the flow of ions on the face of the receptor electrode and/or homogenisation of the number of ions deposited on the surface of the particles of the same size, carried along by the fluid.

On the contrary, the ionic electrostatic emission device according to the invention comprises a particular local geometry of the active face of its receptor electrode effectively establishing a surface flow of ions, originating from the corona electrode and in the direction of the pseudo-planar active face of the receptor electrode, having an ionic punctual intensity exhibiting in the vicinity of the active face a spatial distribution of ionic intensity of increased homogeneity.

In addition, the invention renders quasi-homogeneous the number of ions deposited on the surface of the aerosol particles of a same size class.

PRIOR ART

The electrostatic device for homogenisation of ionic flow according to the present invention has much wider applications than those of the filtration field. Nevertheless, the closest prior art is essentially constituted by electrostatic dust filters and also by certain devices for depositing ions on surfaces in the field of xerography. As a consequence, analysis of the prior art hereinafter mainly targets these two technical fields and more generally the various techniques of dust filtration and xerography utilising a combination between a corona electrode emitting ions and a porous receptor electrode.

For medical, sanitary and air purity reasons, it is desirable to filter the small particles of air and especially industrial dust, pollens, bacteria, virus, fungus, algae, and other dust fines . . . Beyond systems operating by gravity (depositing of particles due to their weight) and cyclone systems operating by centrifugal force (both of which are used in certain specific industrial applications and end up as very bulky systems), the two most current methods for ensuring decontamination of dust in air consist of: —one barring the flow of air by means of an agent (mechanical filter), —and the other deviating and capturing the dust by an electrostatic method (electrofilter). An electrostatic filter is based on the principle that particles, having a certain charge, are attracted by a collective electrode of the opposite charge. This method has been used widely in industry since its invention by F. G. Cottrell in 1910. Previously known means are used to give an electrostatic charge to the particles, and, using an electrostatic field, these charged particles are precipitated on a collective wall or a collector agent kept under electric voltage of opposite signs. There are mainly two classes of electrostatic filter structures: —single stage, and double stage. There are also two variants of electrostatic precipitation means: —that of electrodes charged under voltage generated externally by electric feed, —and that of electrostatic auto-charging, charged by air friction. The closest field to the invention is that of double-stage electrofilters, whereof one stage is initial ionisation by external electric feed.

Double-stage electrofilters, also known as electrostatic precipitators, are highly complex, very costly and high efficacy. They comprise an electric charge stage by corona effect of particles and a precipitation stage. During the electric charge stage the air passes over an ionisation zone constituted generally by one or more high-voltage wires (corona electrodes) to generate an intense electrostatic field, in the midst of which the particles are charged electrically by ionisation. Then the air flow comprising the charged particles passes over a second collection stage. Two types of double-stage electrostatic filters are distinguished, according to the structure of the collector stage of the charged particles (-plate, —or filtering agent).

The particulars of the electrofilters close to the teaching of the invention exclusively concern preliminary generation of ions and their deposit on the particles to be filtered (and more specifically command of the homogeneity of the flow of ions) and not the efficacy of the precipitation of dust.

A first major fault in ionisation systems according to the prior art is that they do not have any means allowing a uniform quantity of ions to be deposited on the treated aerosol particles. The consequence of this is that a portion of the particles generally receives a sufficient quantity of ions (in fact, more than necessary) and another receives a quantity of ions too low to end up with an ulterior sufficient physical result. This reduces the efficacy of the electrofilters.

A second limitation to the prior art relative to ionic treatment of particles is that it does not provide an arrangement for depositing, on aerosol particles, a quasi-homogeneous quantity of ions ($i^{q+}$) and ($i^{q-}$) of opposite charges. This seems due to the fact that at first it seems undesirable (even harmful) to deposit opposite charges on the same aerosol particle. In effect, commonsense tends to point out that the ions of opposite charge are going to cancel each other out and that a reduced physical effect will thus be obtained. The inventors have ascertained that in particular industrial applications it was preferable to deposit on the external surface of aerosol particles (especially of the same diameter and/or same substance) quantities of ions both of opposite charge and of a quasi-homogeneous quantity for each sign.

These two first types of faults of the prior art are mainly due to the fact that the flow of treated air has a transverse section generally vastly superior to the efficacious transverse dimension of the discharge zones of corona electrodes used. Because of this, and in the absence of corrections connected to a particular local geometry of the receptor electrode, the flow of ions reaching the aerosol particles decreases sharply in the transverse direction of the flow of fluid.

A third defect in the prior art is that when it aims to homogenise a flow of ions, this is done: —either in the event where there is no displacement of fluid (such as in xerographic systems), —or in the event of geometry not permitting homogeneous ionic charging of aerosol particles within substantial fluid rates.

The particular geometries of receptor electrodes utilised in the prior art in ionic generators acting on aerosol particles (especially in electrofilters) do not generally intend to increase the ionic homogeneity, rather merely increase the electrostatic action between the receptor electrode and previously charged particles, with a view to increasing detection of dust. In addition, when particular geometries of receptor electrodes are used by the prior art, these relate to: —macroscopic global geometries of the system, —and not local surface geometries whose aim is ionic homogenisation, as is the case for the invention.

U.S. Pat. No. 4,904,283 describes a filtration system constituted by a single longilinear corona electrode placed at the centre of a cylinder constituted by a filtering material and blocked at one end. The fluid charged with particles is introduced at the other free end of the filtering cylinder. The ionic flow in this cylindrical corona tube decreases as an inverse function of the distance to the centre. The ionic deposit on the aerosol particles passing over it is thus very inhomogeneous in the section of the tube. No particular local geometry of the surface of the receptor electrode (the interior of the cylinder) is provided and/or described for increasing the homogeneity of ionic deposit. This device does not permit and furthermore does not claim homogenisation of the deposit of ions on the aerosol particles.

U.S. Pat. No. 4,979,364 describes an electrofilter comprising upstream a first ionising stage formed from a series of cylindrical discharge electrodes, perpendicular to the flow of fluid and a second filtering stage downstream constituted by a longitudinal beehive array subjected to an electric or magnetic field. No local geometric arrangement of the surface of the receptor electrode (beehive) is provided to increase the homogeneity of the deposit of ions on the particles.

The aim of U.S. Pat. No. 4,910,637 is to homogenise the flow of ions transmitted and the quantity of ozone emitted by a corona electrode in a xerographic system. A 'barrier' is placed between the corona electrode and the plane on which the ions are to be deposited. The proposed barrier is constituted a) either by a dope material such as glass or ceramic, b) or by glass or porous ceramic, c) or by a dispersion of metal or ceramic, d) or a conductive or semi-conductive material, e) or by a fibrous material having a catalysis function. The originality of this device does not therefore concern a particular surface geometry of the receptor electrode, but a particular choice of materials. In addition, this device is intended for deposit of ions on a planar surface and not on aerosol particles. Finally, the system does not affect any fluid in movement.

U.S. Pat. No. 4,871,515 describes an electrostatic filter comprising a corona electrode and a receptor electrode whose structure is fitted with convolutions, pores or crevasses to increase its retention capacity. No local geometric particularity of the surface of the receptor electrode is provided to increase the homogeneity of the ionic flow and the deposit of ions on the aerosol particles.

U.S. Pat. No. 4,597,781 describes an electrostatic precipitator comprising a central corona electrode generating negative ions, surrounded by a receptor electrode constituted by a cylindrical collector tube. The receptor electrode has no particular local geometry of its active surface. The ionic flow in this cylindrical corona tube decreases as an inverse function of the distance to the centre. The ionic deposit on the aerosol particles passing through it is thus very inhomogeneous.

U.S. Pat. No. 4,898,105 describes an electrostatic filter constituted by a first stage of ionic charging constituted by corona electrodes placed transversally to the flow of air and a second filtration stage (which can be assimilated into a receptor electrode) (decorated by a layer of non-conductive granules and a means for creating a transversal electrostatic field across this layer. The system doe snot provide any particular local geometry of the surface of the layer of granules whose effect is homogenisation of the ionic flow originating from the first stage.

U.S. Pat. No. 4,313,739 describes a device for extracting a gas for purifying a contaminant gas. The latter is constituted by an external tube including a porous cylinder (which can be qualified as receptor electrode) placed internally and a corona electrode placed in its centre. A difference in potential is applied between the corona electrode and the cylinder. The gas to be purified is introduced at one end of the cylinder. The system extracts a contaminant gas as a function of its difference in ionisation potential vis-à-vis that of the gas to be purified. The wall of the cylinder (receptor electrode) is either constituted by a porous material, that is, one not having any particular surface geometry, or is provided with pores traversing it and distributed over its circumference. The active face of the receptor electrode is not provided with any particular geometry (surrounding the pores) on its active internal face. This device does not allow and also does not claim homogenisation of the deposit of ions on the aerosol particles.

U.S. Pat. No. 4,066,526 describes an electrostatic filter constituted by a corona electrode and a receptor electrode. The receptor electrode has no particular geometry on its active face. This device does not allow and also does not claim homogenisation of the deposit of ions on the aerosol particles.

U.S. Pat. No. 4,056,372 describes an electrostatic precipitator constituted by parallel metallic plates placed under alternating electric voltage and fitted with points at their ends. In a variant, corona electrodes of filaire type are placed upstream parallel and facing the stack of plates. The flow of discharge ions is emitted transversally between the filaire corona electrodes and parallel filaire receptor electrodes. This device does not describe a receptor electrode placed transversally to the fluid path. The plates do not constitute receptor electrodes facing the filaire corona electrodes. In addition, the surface of the plates is not provided with any quasi-circular orifice on their surface. This device does not allow and also does not claim homogenisation of the deposit of ions on the aerosol particles.

U.S. Pat. No. 5,622,543 describes an air purifier including a planar generatrix plate of anions (corona electrode) fitted with craters facing a planar receptor electrode provided with spaced holes. This device comprises no particular geometry on the surface of the receptor electrode in view of the homogenisation of the deposit of ions on the aerosol particles.

U.S. Pat. No. 5,402,639 describes an electrostatic system for dedusting a gas, constituted by a hollow cylinder with a ceramic beehive wall, having orifices oriented radially, terminating from the interior towards the exterior of the cylinder and subjected to an internal electrical field by means of external electrodes, and by a corona electrode situated in its centre. Apart from its orifices, the cylinder has no particular local surface geometry on its internal face facing the corona electrode which is suitable for enabling homogenisation of the deposit of ions on the aerosol particles. In addition, due to its cylindrical structure, and for the same reasons as described hereinabove, this system ensures an inhomogeneous deposit of ions on the particles.

U.S. Pat. No. 4,920,266 describes a xerographic system for depositing negatives charges on a surface. This system comprises corona electrodes constituted by a series of points disposed linearly side by side, facing a receptor electrode constituted by a metallic grille pierced by hexagonal orifices. Apart from its orifices, the receptor electrode does not comprise any particular surface geometry suitable for enabling homogenisation of a flow of ions. In addition this device is intended for deposit of ions on a planar surface and not on aerosol particles. Finally, the system does not affect any fluid in movement.

U.S. Pat. No. 5,474,600, in the name of the applicants, describes a bacteriological purification system, comprising an ionisation stage formed by a receptor electrode made of porous cellular metal and a discharge corona electrode facing the latter. No local geometric characteristic feature of the surface of the receptor electrode is provided to increase the homogeneity of the ionic flow and/or deposit of ions on the aerosol particles.

SUMMARY OF THE INVENTION

In its general form the invention relates to an electrostatic ionic emission device homogenised for depositing on the surface of a multitude of aerosol particles within a fluid, belonging to the same class of diameters, a quasi-homogeneous quantity of ions having the same charge.

An electrostatic ionic emission device according to the present invention is of the type described hereinbelow constituted by the combination between—on the one hand, a conductive discharge corona electrode, subjected to an electric discharge potential and emitting a flow of ions, —and, on the other hand, a conductive non-corona receptor electrode, subjected to a different electric reception potential. The receptor electrode has a pseudo-planar active face, situated opposite the corona electrode and distant from its discharge zone. The free space separating the active face of the receptor electrode from the corona electrode is free. A multitude of through channels of fluid traverses the receptor electrode. They terminate via a multitude of quasi-circular orifices, on its active face, according to a so-called flow axis, substantially perpendicular to the active face. These channels ensure, in the vicinity of the active face, a flow of the fluid according to veins crossing the receptor electrode and are overall substantially parallel to the flow axis of fluid charged with aerosol particles. The device further comprises means for pressurising a fluid, ensuring movement of the fluid (especially across the thickness of the receptor electrode), substantially in said flow axis and along the veins. The device is equipped with a source of electric current, comprising at least two metallic terminals having a sufficiently high electric potential difference between them (of the order of 5000V) and at least two conductors, each connected by an end to one of the potential terminals and/or to earth, and by the other end, respectively to a difference of the corona electrodes and receptor, to subject these two electrodes to a difference in electric potential sufficient to ensure ionic emission in the discharge zone of the corona electrode.

An electrostatic ionic emission device according to the present invention is remarkable by the following combination:

On the one hand, the multitude of through channels for fluid is positioned across the receptor electrode in such a way that the multitude of their orifices is distributed quasi-uniformly on the active face, in the two geometric directions of this face. And, on the other hand, the pseudo-planar active face of the receptor electrode is covered with a plurality of zones sharpened to a point, sharp-edged and/or spiky. The latter emerge in relief from the active face. They present locally and at their end a minimum surface bend radius. These sharp zones are also distributed quasi-uniformly on this active face, in the two geometric directions of the surface and surround the orifices.

Object

This particular local geometric combination of the receptor electrode enables a surface flow of ions, originating from the corona electrode and in the direction of the pseudo-planar active face of the receptor electrode, having a punctual ionic intensity exhibiting at neighbouring points of the active face, a spatial distribution of ionic intensity a homogeneity accrue, relative to the variation in spatial distance between—the point of projection corresponding to the active face of the receptor electrode, —and the so-called zone of principal ionic action surrounding the geometric centre of the formed figure of the straight projection of the discharge zone of the corona electrode on the pseudo-planar active surface.

This ionic homogeneity is established in a wide effective zone surrounding the geometric centre. In such a way that in this large efficacious zone a quasi-uniform quantity of ions is deposited on the surface of the aerosol particles (of the same diameter class) transported by the fluid across the orifices.

DRAWINGS AND FIGURES

FIGS. 1.a and 1.b show diagrammatically, in section and in perspective, the state of the prior art in the form of an electrostatic ionic emission device.

FIGS. 2.a and 2.b show diagrammatically, in section and in perspective, the closest prior art constituted by the electrostatic ionic emission device equipping the bacteriological purification system forming the object of U.S. Pat. No. 5,474,600.

FIGS. 3.a and 3.b show diagrammatically, in section and in perspective, the principal arrangements of an electrostatic ionic emission device for flow homogenisation and deposit of ions according to the present invention.

Figure 15:
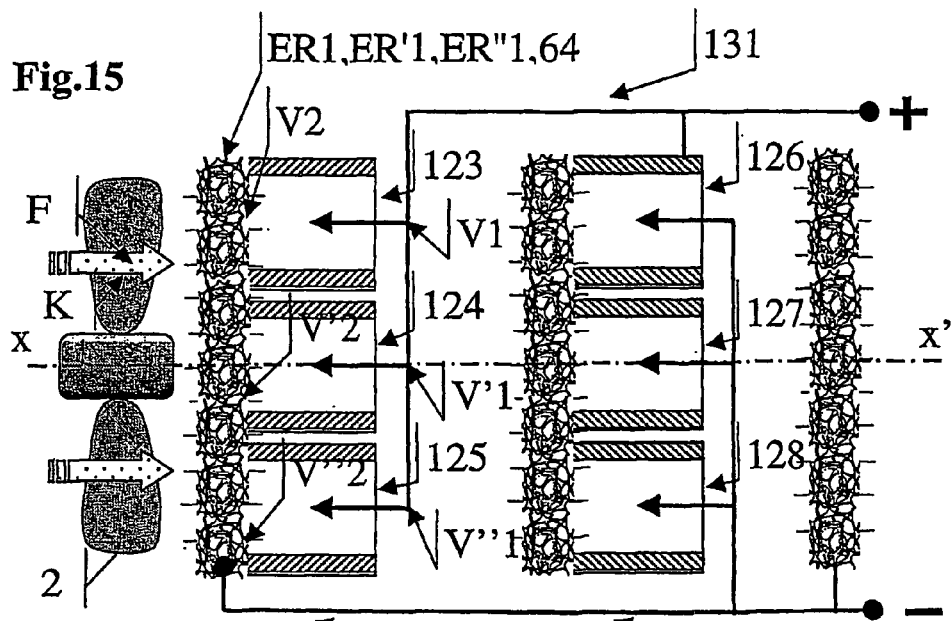

FIG. 15 describes, in section, a variant of the bi-ionic emission system according to the present invention with corona electrodes arranged in series and in parallel.

Figure 14:
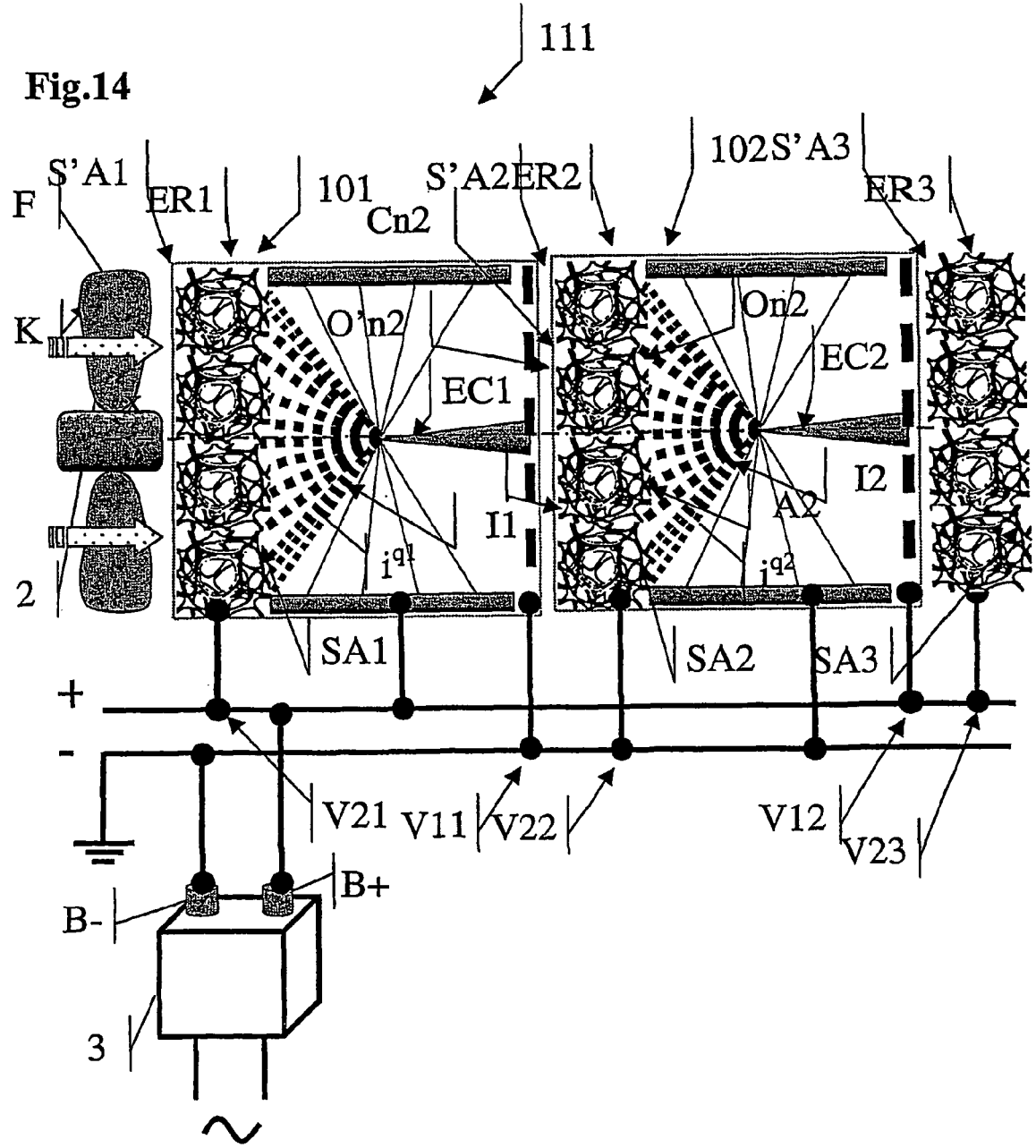
FIG. 14 shows diagrammatically, in section, another variant of the bi-ionic emission system recommended by the invention, whereof the receptor electrodes are made of the material described in FIGS. 8 to 12.
Figure 16:
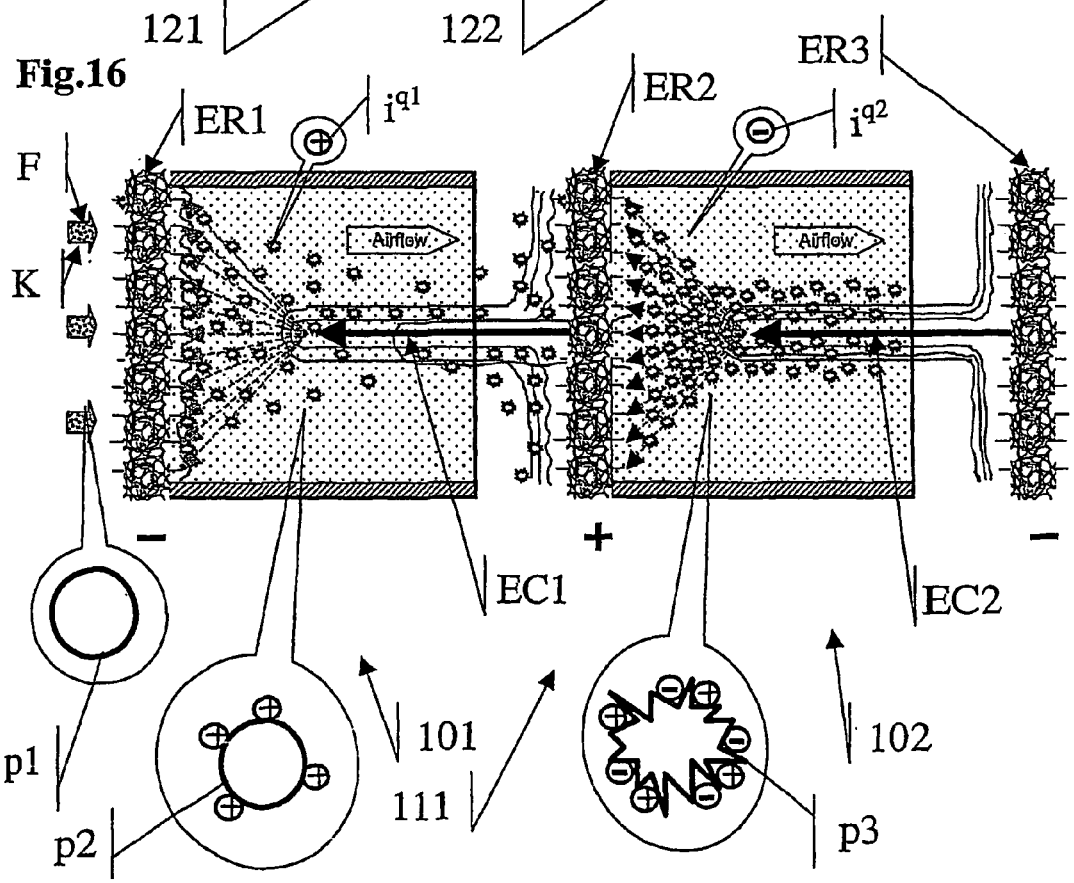
Figure 17:
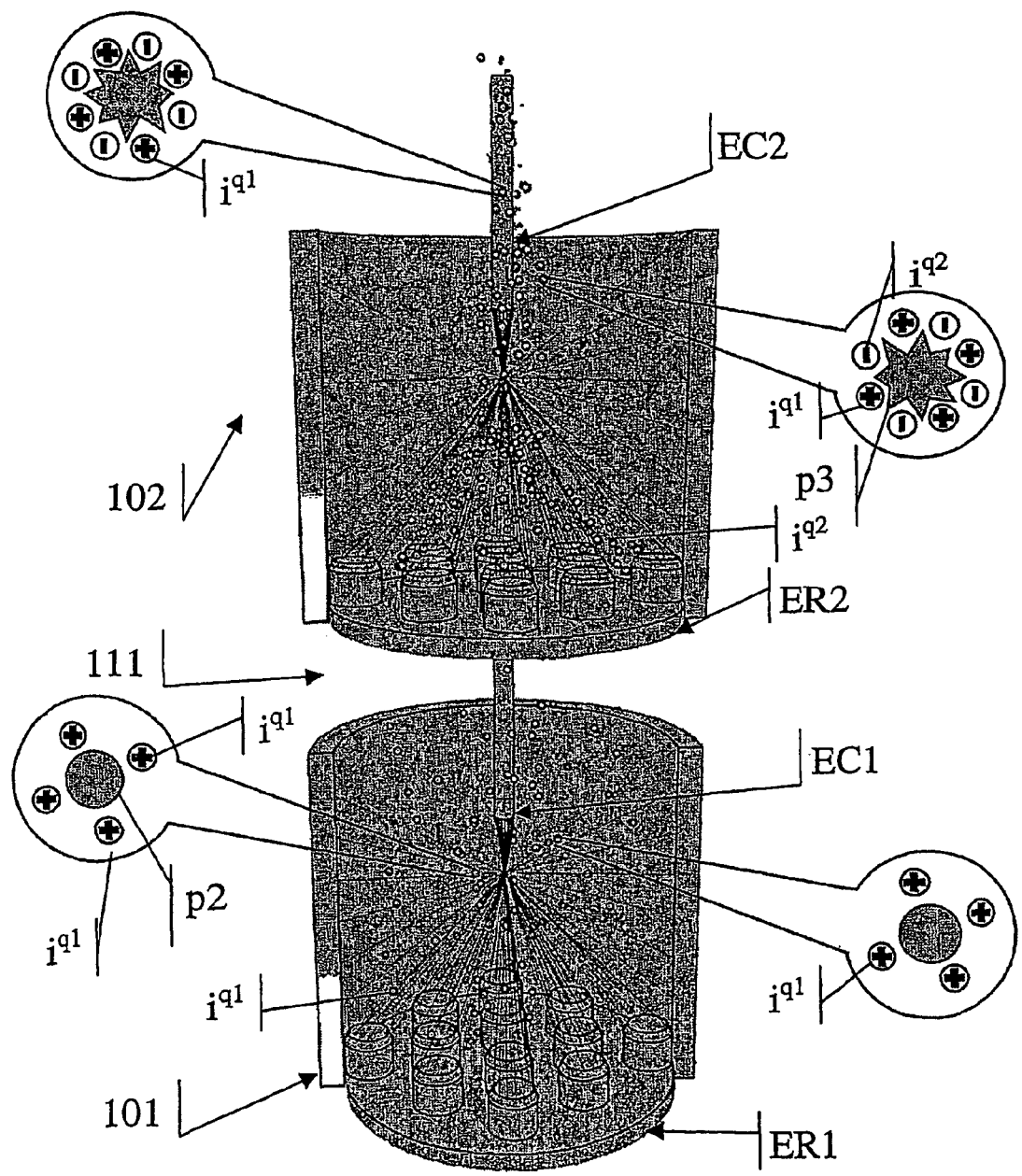

FIGS. 16 and 17 show in section and in perspective, the action of a bi-ionic emission system such as that in FIG. 14 on aerosol particles in a fluid in movement.

DETAILED DESCRIPTION OF THE USE OF THE INVENTION

FIGS. 1.a and 1.b show diagrammatically, in section (FIG. 1.a) and in perspective (FIG. 1.b), an electrostatic ionic emission device (11) according to the prior art. The electrostatic ionic emission device (11) according to the prior art comprises a corona discharge conductive electrode (EC), subjected to a negative electric discharge potential (VI), emitting a global flow (I) of negative ions ($i^q$). It also comprises a non-corona conductive receptor electrode (ER), subjected to a positive electric receptor potential (V2). The receptor electrode (ER) has an active face (SA) situated opposite the corona electrode (EC). It is at a distance (di) from its negative ion ($i^q$) discharge zone (D). The space (H) separating the active face (SA) of the corona electrode (EC) is free. The receptor electrode (ER) is porous. It has a multitude of through channels of the fluid (C1, C2, . . . , Cn), traversing the receptor electrode (ER), and terminating in a multitude of orifices (O1, O2, . . . , On) on its active face (SA), according to a so-called flow axis (xx'), substantially perpendicular to the active face (SA). Means for pressurising a fluid (not illustrated) ensures movement of the fluid (F) especially across the thickness (er) of the receptor electrode (ER), substantially in the flow axis (xx').

In accordance with the prior art the surface geometry of the active face (SA) is random. No particular local geometric arrangement of the active face (SA) is provided around the orifices (O1, . . . ) to homogenise the flow of negative ions ($i^q$).

The left portion of FIG. 1.a illustrates the curve (12) of the intensity (J(Q)) of the surface flow (Is(r)) of ions ($i^q$) in a plane (uu') near the face (SA). These are ions ($i^q$) —originating from the corona electrode (EC), —and in the direction of the pseudo-planar active face (SA) of the receptor electrode (ER). The intensity (J(Q)) is illustrated according to the axis (xx'). The ionic punctual surface intensity (J(Q)) exhibits a highly inhomogeneous spatial distribution of ionic intensity (J(Q)) at points Q(r) near the active surface (SA). It is noted that it decreases sharply when moving away from the central flow axis (xx') of the device (11), that is, with the increase in spatial distance (r), illustrated according to the axis (yy'), between: —the corresponding projection point (P(r)) of the active face (SA) of the receptor electrode (ER), —and the geometric centre (O) of the projection point of the discharge zone (D) of the corona electrode (EC) on the pseudo-planar active surface (SA).

FIG. 1.a. illustrates the local intensity of the ionic flow Is(r) between the two electrodes (EC, ER) by clusters of ions ($i^q$). The number of ions shown illustrates, on a radial, the intensity of the flow of ions in this direction. It is noted that when the point (Q(r)) and its projection (P(r)) move away from the geometric centre (O), the number of ions reaching the surface (SA) at (Q(r)), and by the same surface flow Is(r), decreases considerably.

FIG. 1.b illustrates in perspective the configuration of the device (11).

FIGS. 2.a and 2.b diagrammatically show, in

FIGS. 2.a and 2.b diagrammatically show, in section (FIG. 2.a) and in perspective (FIG. 2.b), a variant of the prior art in terms of an ionic emission electrostatic device (21) of the type such as described in U.S. Pat. No. 5,474,600 in the name of the applicants. It is noted that the discharge electrode (EC) is constituted by a corona point (22) placed at the end of a needle (23) perpendicular to the active surface (SA). The corona point (22) is surrounded by a hollow metallic tube (25) of minimum wall (26) thickness (ep), colinear to the axis of point (xl,x'l) of the needle (23). The receptor electrode (ER) is made of porous cellular metal. The tube (25) and the electrode (ER) are connected and subjected to the same positive electric potential (V2). The discharge corona conductive electrode (EC) is subjected a negative discharge (Vi) electric potential. It emits a global flow (I) of negative ions ($i^q$) in its discharge zone (D). This flow of ions has been illustrated by way of dotted lines of varying thickness, illustrating its intensity in different directions. In addition, the different microscopic figures intervening in the process (especially the ions and the particles) have been enlarged. It is noted that due to the presence of the receptor electrode (ER), the flow of ions ($i^q$) in the direction of the internal wall of the tube (25) is very weak (fine lines). The curve (27) represents the variations of the ionic surface intensity J(r) in a plane (tt') perpendicular to the axis (xx') and cutting the tube (25) substantially in its centre. The ionic intensity Is(r) weakens rapidly inside the tube (25) and in its central part, as a function of the distance (r) to the axis of the corona electrode (EC). It is easily understood that the variations of ionic intensity J(r) in the plane (tt') are at hr. Also illustrated on the curve (28) are the variations of the ionic intensity J(r) in a plane (uu') parallel to the active surface (SA) of the receptor electrode (ER) in the region of the latter. The ionic intensity J(r) also weakens rapidly as a function of the distance (r) to the axis (xx') of the corona electrode (EC).

The active surface (SA) of the receptor electrode (ER) has no particular local geometry. As illustrated in FIG. 2.b, this can be assimilated in approximation to a holed plate (ER) provided with a multitude of orifices (O1, O2, . . . , On) on its active face (SA) and placed at an end of the tube (25).

FIG. 2.a illustrates a flow (K) of fluid (F) which is made to penetrate into the tube (25) via the receptor electrode (ER). The fluid (F) is charged with a multitude of aerosol particles (p1). It can be considered that these particles (p1) are neutral before penetrating the device (21). After having crossed the receptor electrode (ER), the particles come to face the flow of ions ($i^q$). For reasons mentioned hereinabove of inhomogeneity of flow of ions ($i^q$), it is understood that the aerosol particles (p2) travelling close to the axis (xx') receive a significant quantity of negative ions ($i^q$). Four are illustrated. On the contrary, the particles (p3) transiting at a distance from the axis (xx') receive much fewer negative ions ($i^q$). One is illustrated.

As a consequence, it is understood that this system (21) according to the prior art does not permit either significantly homogenising a flow of ions ($i^q$) in the vicinity of a receptor electrode (ER), or satisfactorily homogenising the flow of ions ($i^q$) deposited on the aerosol particles (p1, p2, p3, . . . ) traversing the system (21) from one side to the other.

FIGS. 3a and 3b describe in section and in perspective, in their most primitive form, the improvements proposed by the invention to the ionic emission device (1). The general arrangements of this device (1) according to the present invention common to the devices (11, 21) of the prior art such as described in references 1.a to 2.b hereinabove, are reprised by the device (1) with the same references and are not repeated.

The ionic emission electrostatic device (1) is intended to deposit on the surface (sp) of a multitude of aerosol particles (p1) in a flow (K) of fluid (F), of the same diameter class (dp), a quasi-homogeneous quantity of ions ($i^q$) of charge (q). This electrostatic device (1) is a type constituted by the combination between a discharge corona conductive electrode (EC), subjected to an electric discharge potential (V1), emitting a global flow (I) of ions ($i^q$) and a porous non-corona conductive receptor electrode (ER), subjected to an electric receptor potential (V2). The receptor electrode (ER) has a pseudo-planar active face (SA), situated opposite the corona electrode (EC) and at a distance (di) from its discharge zone (D). The free space (H) separating its active face (SA) from the point (22) of the corona electrode (EC) is free. A multitude of through channels of the fluid (C1, C2, . . . , Cn) traverses the receptor electrode (ER). They terminate via a multitude of orifices (O1, O2, . . . , On) quasi-circular in form on its active face (SA), according to the so-called flow axis (xx'), substantially perpendicular to the active face (SA). In the region of the active face (SA), they ensure flow of the fluid (F) according to the veins (not illustrated) traversing the receptor electrode (ER) and overall substantially parallel to said axis (xx') of flow (K) of fluid (F).

The electrode (EC) with corona point (22) is surrounded by a hollow tube (25) of minimum wall (26) thickness (ep). The hollow tube (25) is colinear to the point axis (x1,x'1) of the needle (23), according to the axis (xx') of the flow (K) of fluid (F) and situated opposite the active face (SA) of the receptor electrode (ER). This hollow tube (25) encloses longitudinally the veins of fluid (F) relative to the active face (SA) and around the needle (23). Preferably, the hollow tube (25) is constituted by an especially metallic conductive material (34). The hollow tube (25) is carried at the same positive electric potential (V2) as the receptor electrode (ER) to effect electric protection vis-a-vis a negative potential (V1) of the corona electrode (EC).

Figure 13:
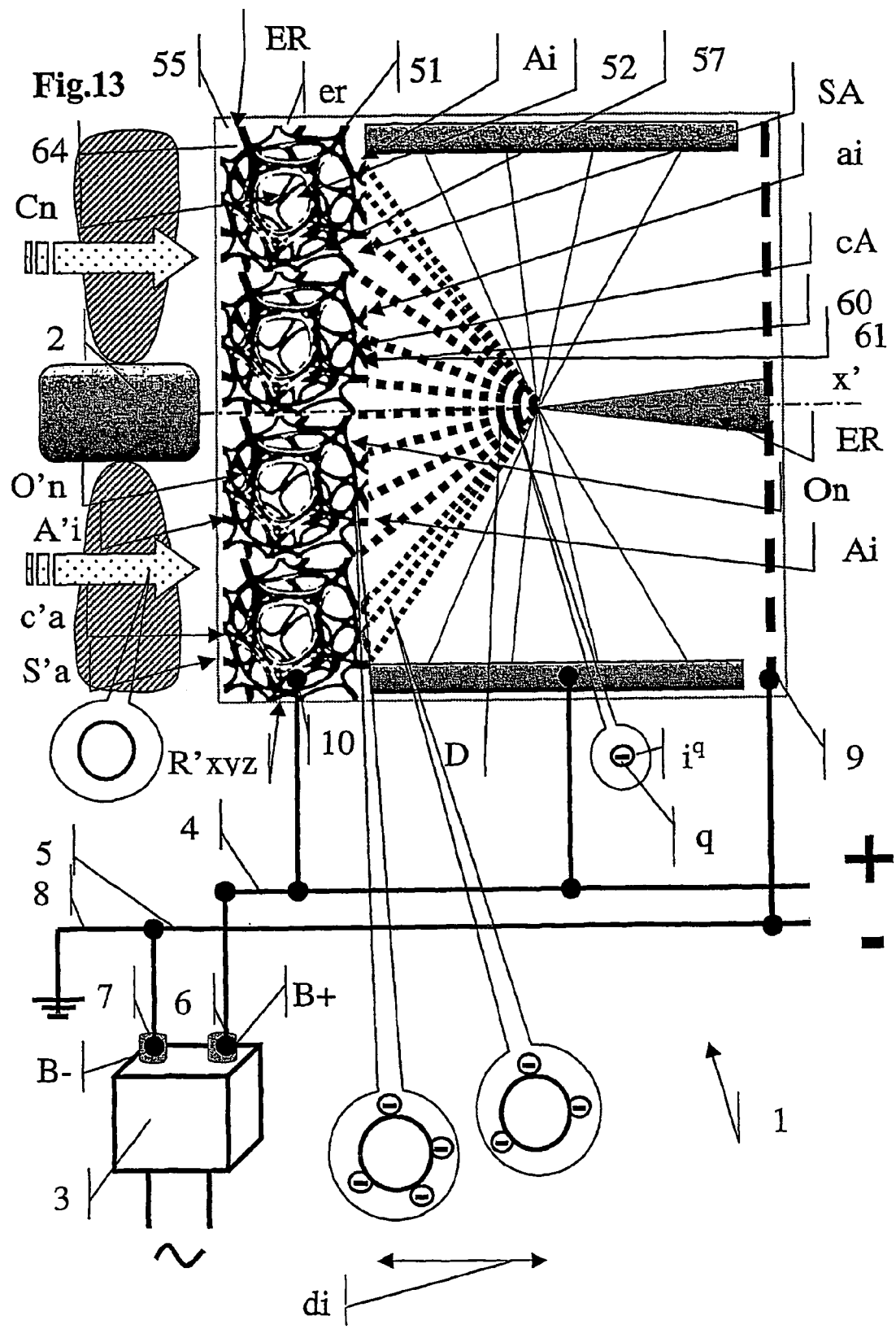
FIG. 13 shows diagrammatically, in section, a variant of the electrostatic ionic emission device recommended by the invention, whereof the receptor electrode is realised by means of the material described in FIGS. 8 to 12.

FIG. 13 describes the additional specific details of the device (1) according to the present invention. Means (2) for pressurising the fluid (and especially a ventilator) ensures movement of the fluid (F), especially via the thickness (er) of the receptor electrode (ER), substantially in said flow axis (xx'), and along said veins (not illustrated). The device (1) is equipped with an electric current source (3) comprising at least two metallic terminals (B+, B−) in sufficiently high electric potential difference between them (of the order of 5000V). Two conductors (4, 5) are each connected by an end (6, 7) to one of the potential terminals (B+, B−) and/or to earth (8), and by the other end (9, 10) respectively to one difference of the corona (EC) and receptor (ER) electrodes. This in order to subject the two electrodes (EC, ER) to a difference of electric potential (V1)< >(V2) sufficient to ensure the ionic emission of ions (iq) in the discharge zone (D).

It is noted with reference to FIG. 3.b that the electrostatic ionic emission device (1) is equipped with a particular combination of the local surface geometry of the face (SA) of the receptor electrode (ER). On the one hand, its multitude of through channels (C1 C2, . . . , Cn) of fluid (F) are positioned across the receptor electrode (ER) such that the multitude of their orifices (O1, O2, . . . , Oi, . . . , On) are distributed quasi-uniformly on the active face (SA), in its two geometric directions (yy', zz'), and on the other hand the pseudo-planar active face (SA) of the receptor electrode (ER) is covered with a plurality of zones sharpened into points (sharp-edged and/or spiky) (Ai). They emerge in relief from the active face (SA) and locally present a minimum surface bend radius (ra). They are distributed quasi-uniformly on this active face (SA), in its two geometric directions (yy', zz'). They enclose the orifices (O1, O2, . . . , Oi, . . . , On).

FIG. 3.a illustrates the flow of ions ($i^q$) originating from the discharge zone (D) of the corona electrode (EC) by means of dotted lines of varying thickness representing its ionic intensity (J(r)) in different directions. It is noted that due to the presence of the plurality of zones sharpened into points (sharp-edged and/or spiky) (Ai) emerging in relief from the active face (SA) and distributed uniformly on the latter, the flow of ions ($i^q$) in the direction of the active face (SA) of the receptor electrode has increased homogenisation (the dotted lines have similar width).

The curve (32), situated in the left part of FIG. 3.a, illustrates the variations of the ionic surface intensity J(r) in a plane (tt') perpendicular to the axis (xx') and cutting the tube (25) substantially in its centre. The ionic surface intensity J(r) weakens rapidly inside the tube (25) as a function of the distance (r) to the axis of the electrode (ER). In addition it is noted that the presence of the points (sharp-edged and/or spiky) (Ai) weakens the overall level of the flow of ions in the direction of the inner wall of the tube (25) relative to what it is (see curve (27), FIG. 2.a) in the absence of the sharp zones (Ai). There is a preponderant electrostatic action of the points (Ai) (sharp-edged and/or spiky) of the active face (SA) vis-a-vis that of the inner wall of the tube 25.

Also illustrated also on the curve (33) are the variations of the ionic surface intensity J(r) in a plane (uu') parallel to the active surface (SA) of the receptor electrode (ER), in the vicinity of the latter. It is noted that, contrary to the curve (28), the ionic surface intensity J(r) on the one hand weakens slightly as a function of the distance (r) to the axis (xx') of the corona electrode (EC), and, on the other hand, at an overall level greater than that which is noted (such as on the curve (32), FIG. 2.*a*) when moving away from the receptor electrode (ER). A consequence of the geometric arrangement described hereinabove is homogenisation of the ionic flow.

In fact, the ionic surface flow (Is(r)) of ions (i$^q$) originating from the corona electrode (EC) in the direction of the pseudo-planar active face (SA) of the receptor electrode (ER), has a punctual ionic surface intensity J(Q(r)) presenting at the points Q(r) near the active face (SA) spatial distribution of ionic intensity J(r) at increased homogeneity, relative to the variation in spatial distance (r) between the projection point (P(r)) corresponding to the active face (SA) of the receptor electrode (ER), and the principal ionic action zone (A) enclosing the geometric centre (O) of the figure (G) of the straight projection of the discharge zone (D) of the corona electrode (EC) on the pseudo-planar active face (SA). This is noted in a wide efficacious zone (S) enclosing the geometric centre (O) occupying the entire section of the tube (25). So much so that in this efficacious zone (S), and thus in the entire section of the tube (25), a quasi-uniform quantity of ions (i$^q$) is deposited in the vicinity of the receptor electrode (ER) on the surface (sp) of the aerosol particles (p1, . . . ) of the same class of diameter (dp) transported by the fluid (F) via the orifices (O1, O2, . . . , On). In addition, the influence of the inhomogeneity of the ionic deposit in the central part (tt') is very weak for the reasons cited hereinabove. So much so that the deposit of ions (i$^q$) on the surface (sp) of the aerosol particles (p1) crossing from one side to the other in the system (1) is considerably homogenised relative to what would be obtained when passing via a device (11, 21) according to the prior art. The result of laboratory trials conducted by the applicants on a device (1) according to the present invention confirms this physical characteristic feature. The inventors have been able to confirm experimentally by modifying the receptor electrodes of a device such as described in U.S. Pat. No. 5,474,600 according to the teaching of the invention and by measuring the physical results of the homogenisation of the ionic deposit.

The invention can be utilised advantageously with several types of corona electrodes (EC).

Accordingly, according to the variant illustrated in FIGS. 3.*a* and 3.*b*, the device (1) comprises the characteristic combination between: the pseudo-planar active face (SA) of the receptor electrode (ER) covered by a quasi-uniformly distributed plurality of sharpened emerging zones (Ai) surrounding orifices (O1, O2, . . . , On) also quasi-uniformly distributed, and a discharge electrode (EC) constituted by a corona point (22) placed at the end of a needle (23). The latter is oriented according to a point axis (x1, x1') perpendicular to the pseudo-planar active face (SA), in the direction of the sharpened emerging zones (Ai), and positioned at a distance (di) opposite the active face (SA).

Figure 6:
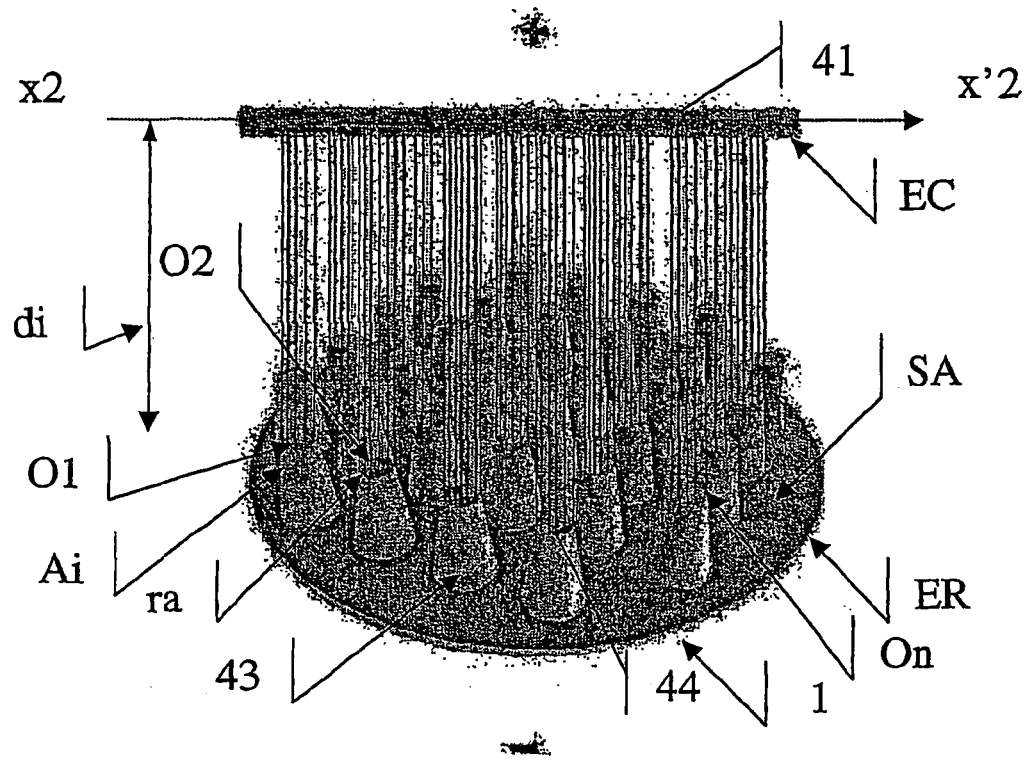
Figure 7:
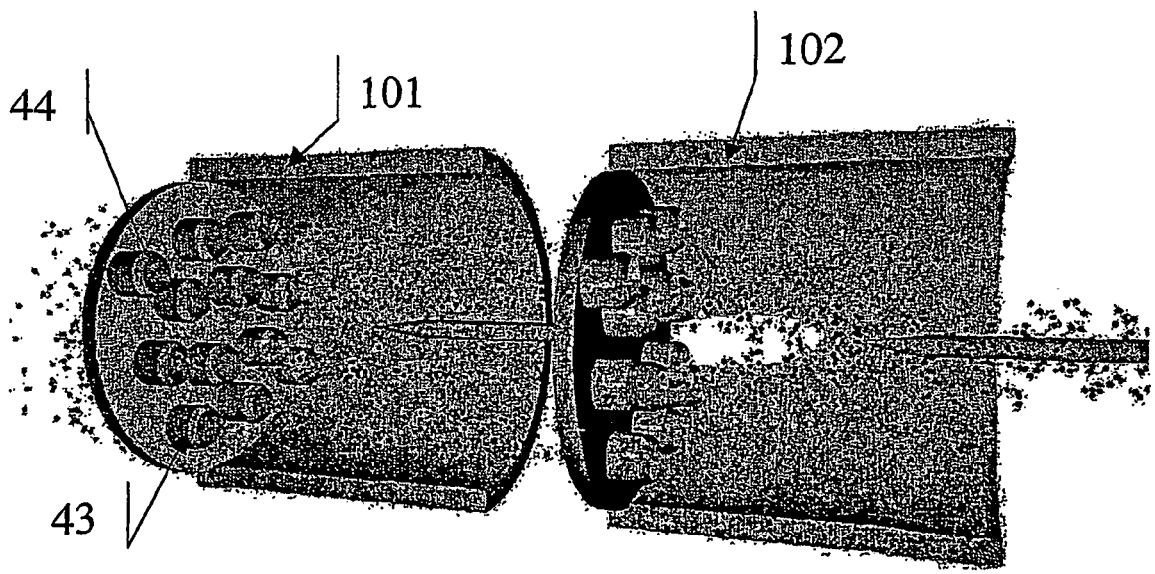
FIG. 7 shows in section and in perspective a bi-ionic emission system according to the present invention traversed by a fluid charged with aerosol particles.

According to the variant illustrated in FIG. 6 the device (1) comprises the characteristic combination between: the pseudo-planar active face (SA) of its receptor electrode (ER) covered by a quasi-uniformly distributed plurality of sharpened emerging zones (Ai) enclosing the orifices (O1, O2, . . . , On) also quasi-uniformly distributed, and a discharge electrode (EC) constituted by a conductive wire (41), oriented according to an axis (x2, x'2), substantially parallel to the pseudo-planar active face (SA). The conductive wire (41) is substantially perpendicular to the sharpened emerging zones (Ai), and positioned at a distance (di) opposite the active face (SA).

The invention recommends several types of geometry of sharpened emerging zones (Ai). According to the variant described in FIGS. 3.*a* and 3.*b* the pseudo-planar active face (SA) of the receptor electrode (ER) is covered by a quasi-uniformly distributed plurality of sharpened emerging zones (Ai) in the form of sharpened spiky points (42) uniformly distributed, presenting locally a minimum surface bend radius (ra), surrounding the uniformly distributed orifices (O1, O2, . . . , On). These sharpened spiky points (42) point towards the exterior of the active face (SA), according to a substantially perpendicular axis (xx'), in the direction of the discharge zone (D).

Figure 4:
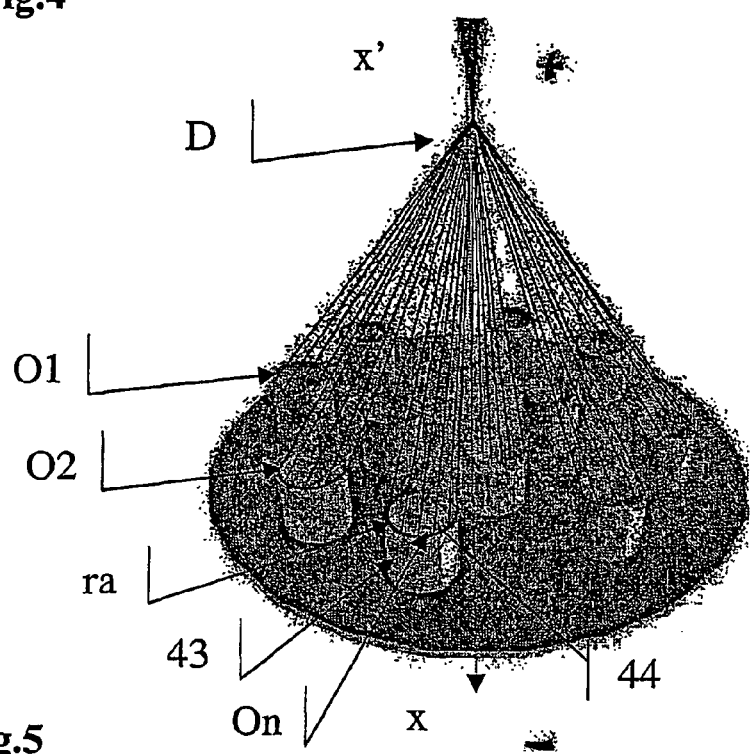
FIGS. 4, 5 and 6 show in perspective three variants of an electrostatic ionic emission device according to the present invention.
Figure 5:
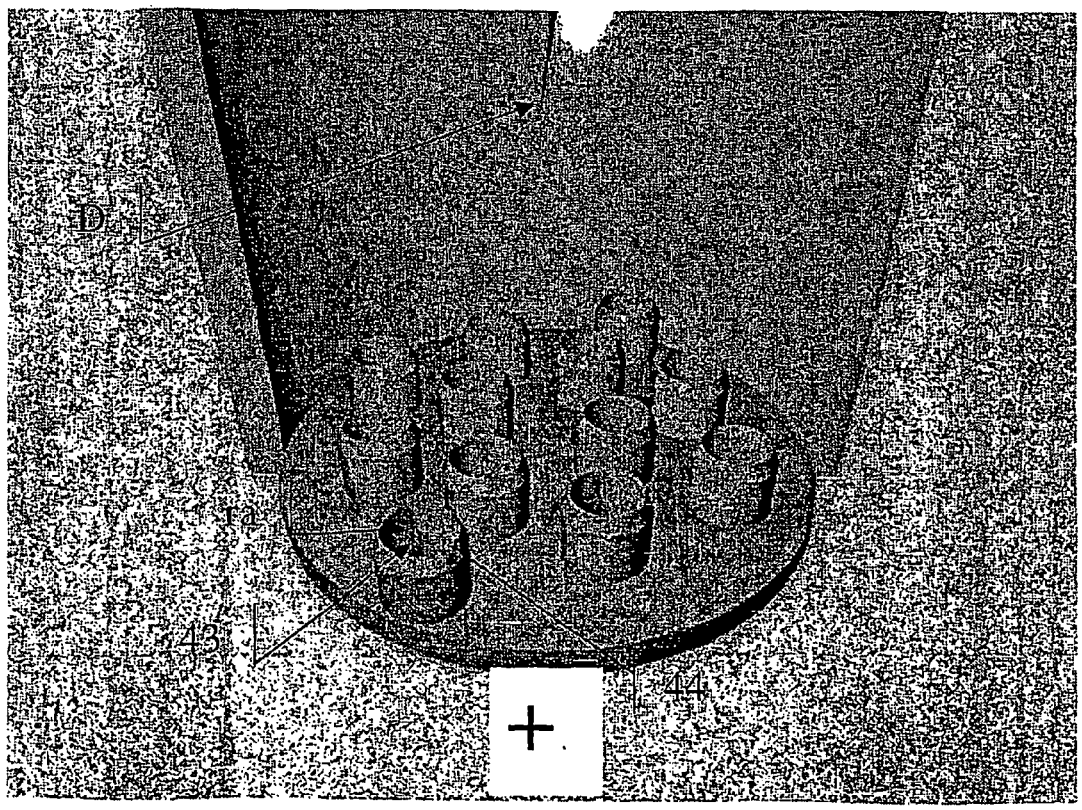

According to the variants described in FIGS. 4, 5 and 6, the pseudo-planar active face (SA) of the receptor electrode (ER) is covered by a quasi-uniformly distributed plurality of craters (43) with sharp edges (Ai) closed in a pseudo circle (44). They have on their extreme edges a section of minimum bend radius (ra), surrounding the orifices (O1, O2, . . . , On), and terminate towards the exterior of the active face (SA), according to a substantially perpendicular axis (xx'), in the direction of the discharge zone (D).

FIG. 13 illustrates the variant embodiment recommended by the invention of an electrostatic device (1) for homogenised ionic emission. The receptor electrode (ER) is constituted by a porous structure (51). Its zones sharpened into points (sharp-edged and/or spiky) (Ai) are distributed quasi-uniformly on its active face (SA) and are interconnected by means of this porous structure (51).

The receptor electrode (ER) is constituted by a porous structure (51) with alveolar mesh (52) constituted by an assembly in an array of fins (Ai, an) with longilinear portions (57). The plurality of its zones sharpened into points (sharp-edged and/or spiky) (Ai) distributed quasi-uniformly on the active face (SA) is delimited by sectioning of the structure of alveolar mesh (52) of the porous structure (51) to the right of the active face (SA).

The variant embodiment preferred by the invention of a receptor electrode (ER) according to the invention appears in FIGS. 8 to 12. The receptor electrode (ER) supporting the pseudo-planar active face (SA) is created by means of a porous conductor block (55). This is constituted by a pseudo-repetitive porous structure (51) with alveolar mesh (52) formed from a plurality of fins ( . . . , an, . . . ) with longilinear portions (57), constituted by an especially metallic conductive material (58).

Figure 8:
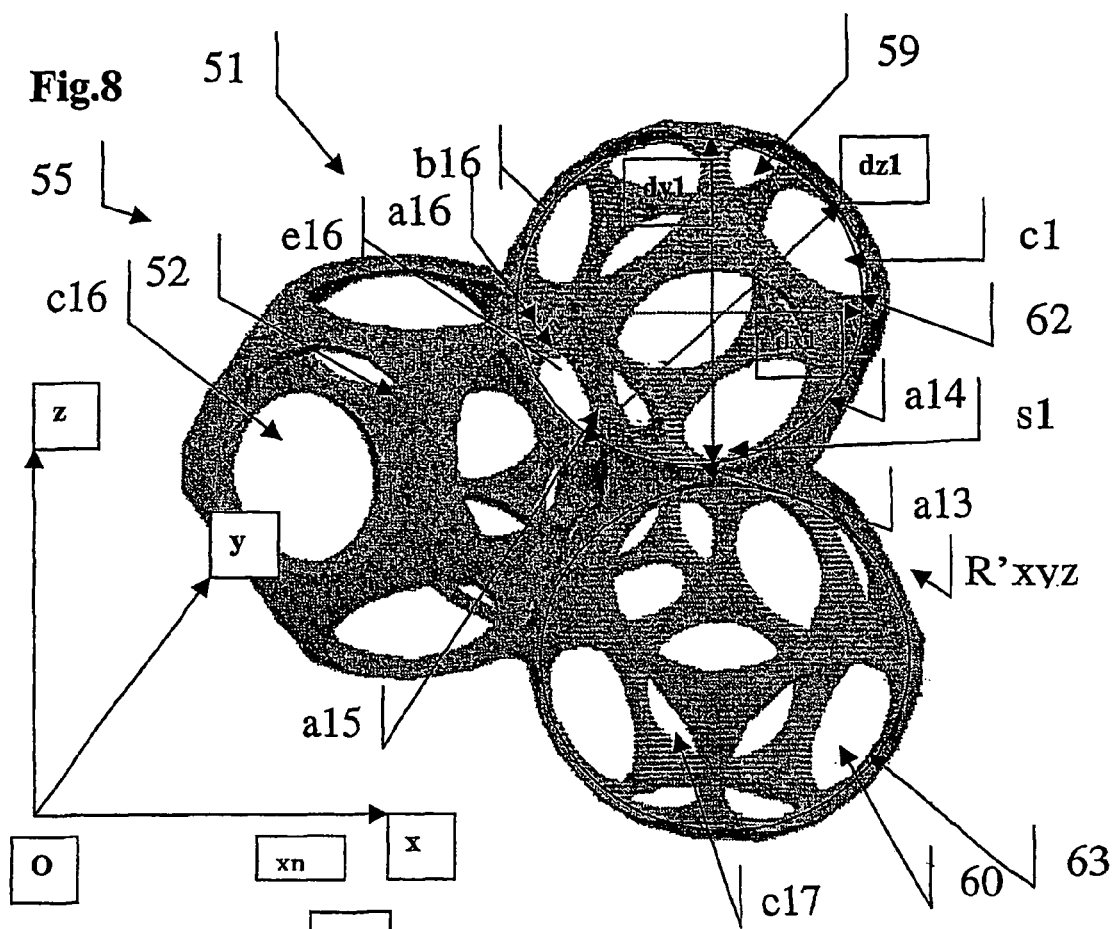
FIGS. 8 to 12 show the characteristic features of the constitution of a conductive material recommended by the invention to constitute the porous receptor electrode of an electrostatic ionic emission device.
Figure 9:
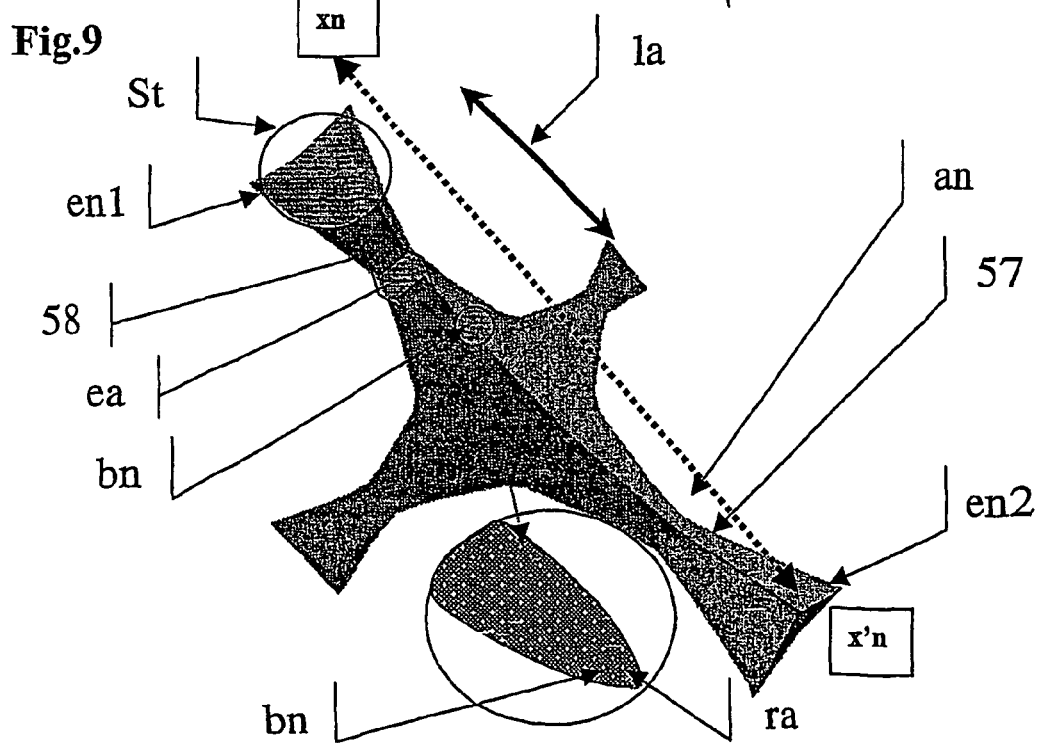

As in FIGS. 8 and 9, the fins (an) have a fine transverse section (St), of a thickness (ea) much less than their longitudinal dimension (la). They comprise at least one lateral trailing edge (bn), elongated and tapered, (that is, of minimum local transverse bend radius (ra)) oriented in the direction (xn, x'n) of the length of the fins (an).

As evident in FIG. 8, the fins ( . . . , a13, a14, a15, a16, . . . , an, . . . ) are physically and electrically interconnected by each of their ends (en1, en2) to constitute a three-dimensional conductive array (R'xyz). They are linked and grouped geometrically to form a multiplicity of elementary cells (c1, . . . , c16, c17, . . . ), communicating between one another to form the through channels (C1, C2, Cn) of fluid (F). The internal fins (a13) on the porous block (55) are mainly common to several elementary cells ( . . . , c1, . . . , c17, . . . ). The majority of the linked fins (a13, a14, . . . ) belonging to the same internal cell (c1) on the porous block (55) surround and join tangentially, by at least one of their lateral longitudinal faces (s1), a virtual elementary surface (62, 63) peculiar to and internal to each elementary cell (c1, c17), of closed geometry, to contain a compact, empty, elementary cellular volume (59, 60). This means that its transverse dimensions (dx1, dy1, dz1) are of the same order of magnitude in the three directions (x, y, z). The empty, elementary cellular volume (59) of the majority of the cells (c1) situated in the centre of the porous block (55) terminate opposite the empty, elementary volumes ( . . . , 60, . . . ) of neighbouring cells (c16, c17, . . . ) by at least four (and preferably twelve) craters (e16) across their elementary surface (62). Each of the craters (e16) is surrounded by the lateral edge (b16) of fins ( . . . , a16. . . ) belonging to its cell (c16) and common to the neighbouring cells ( . . . , c1, . . . ).

Figure 10:
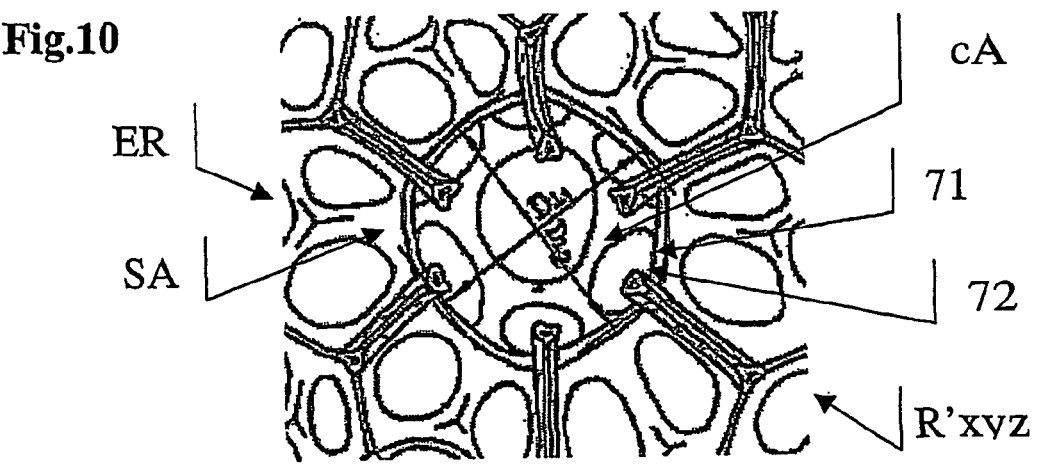

FIG. 10 schematically describes, on en enlarged scale, the surface aspect of the face (SA). With reference to FIGS. 10 and 13 it is noted that the porous block (55) is cut pseudo-planar according to a so-called active face (SA), by sectioning a multitude of elementary cells (cA) of the end wall of the three-dimensional array (R'xyz), distributed uniformly on the active face (SA). A three dimensional array (R'xyz), a multitude of metallic nozzles (71), exhibiting sharp edges (72) and substantially circular in form compared to the active face (SA) is arranged to the right of each sectioned external cell (cA).

With reference to FIG. 8 it is noted that the cells (c16, c17, . . . ) of the porous block (55) are positioned according to their distribution of greater density and have twelve neighbouring cells. They are pierced by twelve craters. The cells (c16, c17, . . . ) have a dodecahedron geometry.

Figure 11:
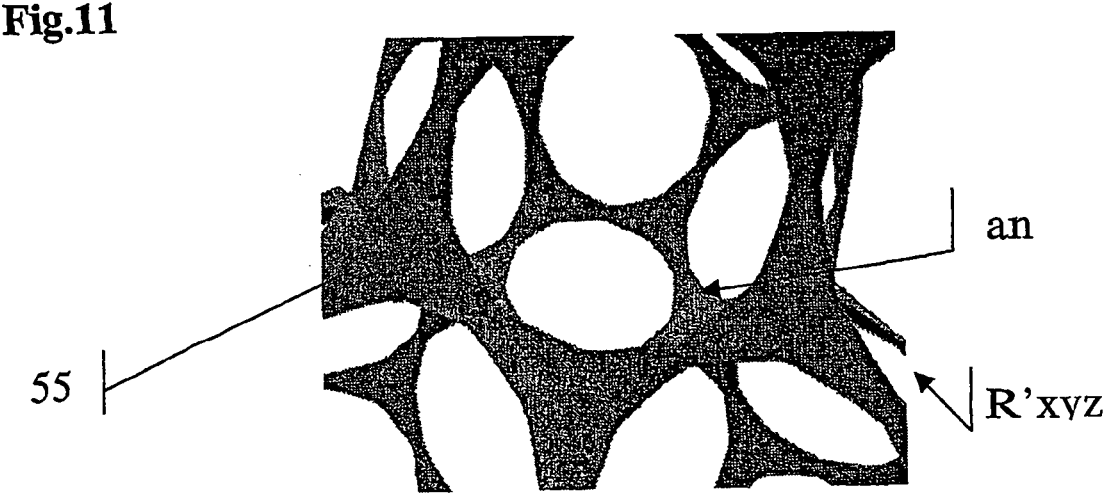
Figure 12:
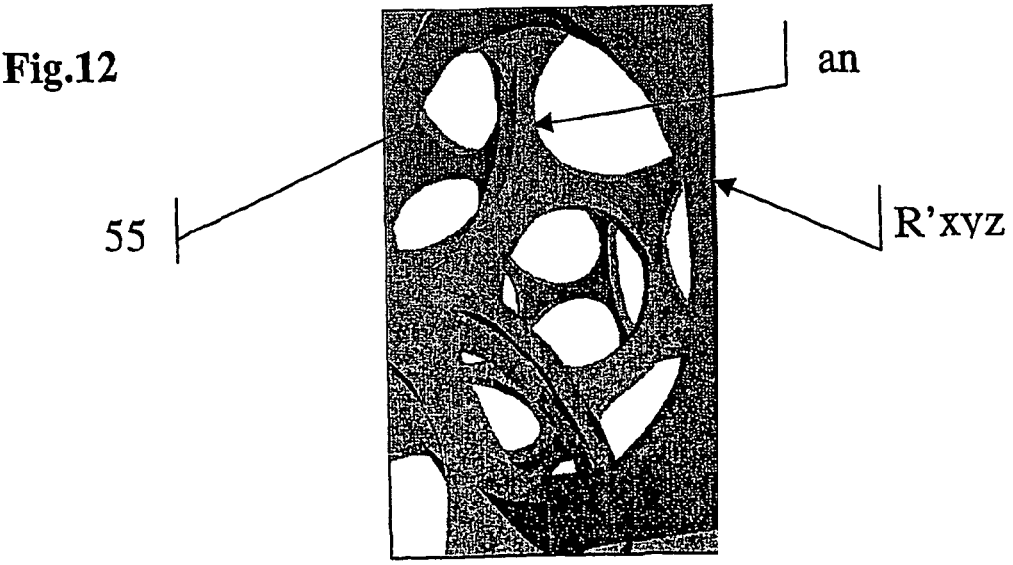

FIGS. 11 and 12 illustrate the interior of the porous block (55) in perspective.

The receptor electrode (ER) of the device (1) illustrated in FIG. 13 is constituted by a substantially planar plate (64) presenting two substantially parallel pseudo-planar lateral faces:

a first so-called active face (SA) is situated opposite the corona electrode (EC) and at a distance (di) from the discharge zone (D), and a second face (S'A). It is noted that the divided external cells (CA, c'A) are distributed on the surface of the two lateral faces (SA, S'A). As has been described in FIG. 10, they provided to the right of each divided external cell (cA, c'A) a multitude of nozzles (72), exhibiting pointed edges (71) of a substantially circular form compared to the corresponding lateral support face (SA, S'A) of the receptor electrode (ER). A multitude of through channels (Cn) of fluid (F) is provided via the internal cells, and traverses the plate (64) constituting the receptor electrode (ER). They connect each of the two faces (SA) and (S'A) of the receptor electrode (ER). They terminate in a multitude of orifices (On) on the first active face (SA), according to a so-called flow axis (xx'), substantially perpendicular to the first active face (SA). They also terminate in a multitude of orifices (O'n) on the second face (S'A), according to the axis (xx') substantially perpendicular to the second face (S'A). Due to the repetitive geometry of the array (R'xyz), the multitude of through channels (Cn) of the fluid (F) are constituted by and positioned across the receptor electrode (ER) in such a way that the multitude of orifices (On) is distributed quasi-uniformly on the first active face (SA), and that the multitude of the orifices (O'n) is also distributed quasi-uniformly on the second active face (S'A). The two pseudo-planar active faces (SA, S'A) of the receptor electrode (ER) are thus each covered in a plurality of zones sharpened into points (sharp-edged and/or spiky) (Ai, A'i). They emerge in relief, those (Ai) of the active face (SA) and the others (A'i) of the active face (SA).

They present locally a minimum surface bend radius (ra). They are distributed quasi-uniformly on the first active face (SA) and on the second face (S'A), and surround said orifices (On) and (O'n).

The recommended manufacturing process for receptor electrodes (ER) according to the invention consists of first creating a primary dielectric or semi-conductor array. This primary array is geometrically identical to that of the array (R'xyz).

To make the primary array the process preferably consists, as in FIG. 8, of intersecting a multitude (preferably twelve) of closed material surfaces, having an envelope of minimum thickness (ea), arranged substantially uniformly in the 3 directions (x, y, z), and made from a first dielectric material (especially constituted by polyurethane).

Next, electrodepositing of a second metallic material (58), especially nickel, is carried out on the primary array. In this way A three-dimensional primary array having an external metallic surface is produced.

The invention recommends producing the receptor electrode (ER) by electrodepositing of nickel on a primary array of polyurethane.

The process first consists of making a plate as a primary porous array of fins (an) made of polyurethane. The primary array of polyurethane is then given electrical conductivity by dipping it into a sensitivity solution of the type: Sn $Cl_1$—25 g/l; HCl—40 ml/l. The primary array is kept in the solution for 10 minutes, then is washed in warm water for 10 minutes. The primary array is then dipped for 5 minutes into a tank containing an activation solution of the type: Pd Cl1—0.5 g/l HCl—10 ml/l. It is then washed in warm water for 10 minutes.

A chemical layer of nickel is then applied to the primary array. To achieve this the primary array is dipped into a solution of the type (en ml/l):

| | |
|---|---|
| $NiSO_4.7H_2O$ | 25 |
| $NaH_2PO_2.H_2O$ | 25 |
| $NaP_2O_7.10H_2O$ | 50 |
| $NH_4OH$ (28% sol) | 23 |

The primary array is kept in the solution for 30 minutes. It is then washed in water for 10 minutes.

Electrodepositing of the nickel is then carried out. To do this, two nickel anodes are placed into an electrolysis vat. The primary array is laced between the two anodes in the vat which is then filled with a solution having a composition of the type (in g/l):

| | | | |
|---|---|---|---|
| $NiSO_4.7H_2O$ | 250 | 1,4 butane diol | 0.15 |
| $NiCl_2$ | 50 | Phthalimide | 0.12 |
| $H_3BO_3$ | 30 | pH | 4.3–5.1 |

The anodes and the primary array are connected to different poles of a direct-current generator. (Anodes to the positive pole, primary array to the negative pole). The intensity of the deposition current is regulated at 0.5 $A/dm^2$ for 7 to 10 minutes. Ten successive deposition cycles are carried out.

After metallic electrodepositing of the conductive material (58), the skeleton constituted by the underlying dielectric material is extracted by calorific or chemical action on the external metallic surface of the primary array. This effectively produces a wholly metallic array (R'xyz). Preferably, the underlying polyurethane structure is withdrawn via a thermal effect. To do this, the nickel-covered array is placed in a reducing atmosphere at a temperature of 1100° C. for 4 hours. The array (R'xyz) of the receptor electrode (ER) is then ready.

The receptor electrode (ER) of the device (1) in FIG. 13 is constituted by a porous structure (51), with alveolar mesh (52) constituted by an array assembly of fins (an) having longilinear portions (57). The plurality of its zones sharpened into points (sharp-edged and/or spiky) (Ai) distributed quasi-uniformly on the first active face (SA) is materialised by dividing the structure of alveolar mesh (52) of the porous structure (51) of the array (R'xyz) to the right of the first active face (SA). Similarly, the plurality of its zones sharpened into points (sharp-edged and/or spiky) (A'i) distributed quasi-uniformly on the second active face (S'A) is materialised by dividing the structure of alveolar mesh (52) of the porous structure (51) to the right of the second face (S'A).

FIG. 14 illustrates an bi-ionic emission electrostatic system (111) according to the invention for depositing for each sign a quasi-homogeneous quantity of ions ($i^{q1}$) and ($i^{q2}$) of opposite charges on the surface (sp) of the same class of diameter (dp) of a multitude of aerosol particles (p1, p2, . . . ) in a fluid (F). This bi-ionic electrostatic system (111) is constituted characteristically by the combination of two ionic emission electrostatic devices (101,102) of inverse polarity chained in series, of the type (1) described hereinabove. The electrostatic devices (101, 102) are disposed in series according to a common axis (xx') of flow (K) of fluid (F). It is noted that the signs of polarity of the couples (V11, V12) and (V21, V22) corresponding, on the one hand, to the electric potential of the conductive corona electrodes (EC1, EC2), and on the other hand, to the electric potential of the conductive non-corona receptor electrodes (ER1, ER2), of each of the two electrostatic devices (101, 102) are inverse. Means (2) for pressurising a fluid common to the two devices (1, 1') ensures movement of the fluid (F) especially via the receptor electrode (ER1) of the device (101) and (ER2) of the device (102), substantially in the common axis (xx') of flow (K) of fluid (F).

The system (111) comprises three non-corona conductive receptor electrodes (ER1, ER2, ER3) connected in series, and operated at varying electric potentials (V21, V22, V23). They were produced according to the manufacturing process described hereinabove. They have the geometry shown in FIGS. 8 to 12. They each have two substantially parallel pseudo-planar lateral faces: a first face (SA1, SA2, SA3), and a second face (S'A1, S'A2, S'A3). A multitude of through channels for fluid (Cni) with (1<=i<=3) traverses each of the receptor electrodes (ERi) with (1<=i<=3) and connects each of the two faces (SAi) and (S'Ai) of each receptor electrode (ERi) with (i<=i<=3). They terminate in a multitude of orifices (O'ni), quasi-circular in shape, on the first active face (SA), along an axis (xx') perpendicular to the first corresponding active face (SAi), with (i<=i<=3). They also terminate in a multitude of orifices (O'ni) quasi-circular in shape, on the second face (S'Al), according to an axis (xx') substantially perpendicular to the second face (S'Ai), with (1<=i<=3).

It is recommended that the system comprise at least two conductive corona discharge electrodes (EC1, EC2), subjected to a varying electric discharge potential (V11, V12), emitting an overall flow (I1) of ions ($i^{q1}$), and (I2) of ions ($i^{q2}$) of opposite signs. The first corona electrode (EC1) is placed between the first couple of receptor electrodes (ER1, ER2). Its discharge zone (D1) is located opposite the active face (SA1) of one (ER1) of the two receptor electrodes (ER1, ER2) of the first pair. The second corona electrode (EC2) is placed between the second couple of receptor electrodes (ER2, ER3). Its discharge zone (D2) is located opposite the active face (SA2) of one (ER2) of the two receptor electrodes (ER2, ER3) of the second pair.

Owing to the manufacturing method (described hereinabove) of the electrodes (ER1, ER2, ER3), on the one hand the multitude of through channels (Cni) with (1<=i<=3) of each receptor electrode (ERi) is positioned across the receptor electrode (ERi) such that the multitude of orifices (Oni) is distributed quasi-uniformly in two directions (yy', zz') on the first active face (SAi). Similarly, the multitude of orifices (O'ni) is distributed quasi-uniformly on the second active face (S'Ai) in two directions (yy', zz').

It is recommended that the two pseudo-planar faces (SA2, S'A2) of the central receptor electrode (ER2) are each covered by a plurality of zones sharpened into points (sharp-edged and/or spiky) (A2, A'2), emerging in relief, some (A2) from the first (SA2), and the other (A'2) from the second active face (SA'2). They locally present a minimum surface bend radius (ra). They are distributed quasi-uniformly in the two directions (yy', zz'). On the first face (SA2) they enclose the corresponding orifices (Oni). On the second face (S'A2) they enclose the corresponding orifices (O'ni). In fact, the three receptor electrodes of the system (111) illustrated in FIG. 14 are identical and have their 2 faces structurally similar.

With reference to FIG. 15, this shows a variant of the bi-ionic emission electrostatic system (111) described in FIG. 14. The electrostatic system (131) has two stages (121,122) of ionic emission, organised in series. Each stage (121,122) is constituted by the parallel characteristic combination of a plurality of ionic emission electrostatic devices (123,124, 125), (126, 127,128) of the type (1) described hereinabove. The electrostatic devices (123,124,125) of the same stage (121) are disposed side by side transversely relative to the overall flow axis (xx') of fluid (F). The signs of polarity of the couples (V1, V', V"1) and (V2, V'2, V"2) of the same stage (121), corresponding to the electric potential of the conductive corona electrodes, and to the electric potential of the non-corona conductive receptor electrodes, or each of the two electrostatic devices (123,124, 125), are similar. The receptor electrodes (ER1, ER'1, ER"1) of the electrostatic devices (123,124,125) are made by a common porous plate (64) constituted by an array (R'xyz) of fins (an) of the type described hereinabove, situated transversely to the axis (xx') of flow (F).

The overall functioning of the bi-ionic emission electrostatic system (111) described in FIG. 14 is described with reference to FIGS. 16 and 17. A flow (K) of fluid (F) charged with particles (p1) is forced inside the bi-ionic system (111) using pressurising means (2) (not illustrated in these figures). Due to the functional characteristic features described hereinabove (common to the electrostatic devices (1) according to the present invention), inside the device (101) and owing to the combined action of the corona electrode (EC1) and the receptor electrode (ER1) according to the invention, the overall flow of positive ions ($i^{q1}$) encountered in the through veins of flow (F), in passing through the device (101) according to the axis (xx') of flow, is quasi-homogeneous in the entire section of its tube (25). As they pass through the first device (101), the particles (p2) are thus charged by a quasi-homogeneous quantity of positive ions ($i^{q1}$). Four positive ions ($i^{q1}$) are illustrated on the particles (p2).

Similarly, within the device (102) and owing to the combined action of the corona electrode (EC2) and the receptor electrode (ER2) according to the invention, the overall flow of negative ions ($i^{q2}$) found in the through veins of flow (F), when passing through the device (102) according to the flow axis (xx'), is quasi-homogeneous in the entire section of its tube (25). When passing through the second device (102), the particles (p3) previously charged quasi-homogeneously with positive ions ($i^{q1}$) are also charged with a quasi-homogeneous quantity of negative ions ($i^{q2}$) Four positive ions ($i^{q1}$) and four negative ions ($i^{q2}$) are illustrated on the particles (p3).

Thus, as they exit from the bi-ionic system (111), the particles (p3) are covered with a homogeneous quantity of ions of opposite signs ($i^{q1}$, $i^{q2}$).

The physical result obtained (illustrated by a star formation of particles ($p^3$)) consists of freeing energy inside the particles (p3) having successively traversed the two electrostatic devices (101, 102) of the bi-ionic system (111). It is understood that, according to industrial applications, this freeing of energy allows, by ionic recombination, mechanical, physical, chemical, energetic consequences to be inflicted on the particles (p3), of reduced intensity.

A characteristic feature of the bi-ionic system (111) according to the invention is that the particles, at first charged with positive charges ($^{q1}$) from passing through the device (101), undergo, after passage of the electrode (ER2) and facing the corona electrode (EC2), the combination of two effects inside the device (102):—
   a concentration effect of their trajectory in the direction of the discharge zone of the corona electrode (EC2) of opposite electric charge (negative),
   and a blast effect of negative ions ($i^{q2}$) oriented according to substantially colinear radials opposed to the movement of the particles (p3), in the zone (H) separating the two electrodes (EC2, ER2) of the device (102).

This appears in FIGS. 16 and 17 as indicated by arrow radials originating from the corona electrode (EC2) of the device (102) in the direction of the receptor electrode (ER2). This causes a "targeting" effect of the shocks between particles (p3) and negative ions ($i^{q2}$) which, on the one hand, increases the efficacy (the quantity) of the deposit of negative ions ($i^{q2}$) on the particles (p3), and, on the other hand, increases the homogeneity of the deposit of negative ions ($i^{q2}$) on the particles (p3), (due to the fact that the particles (p3) transit on radials subjected to an equivalent ionic intensity).

The inventors have ascertained experimentally that the combination of the bi-ionic system (111) according to the invention results in homogeneity (expressed in terms of variation type) of deposits of positive ions ($i^{q1}$) and of negative ions ($i^{q2}$) on particles (p3), which they have measured to be about +−10%. This was measured using devices (101,102) having a tube diameter of 5 cm, each equipped with a distant corona point of 2.5 cm of the receptor electrode and subjected to a potential difference of +−5000 V. The testing was carried out on classes of diameters of particles ranging from 0.01 micron to 3 microns. When the same testing was carried out with ionic emission devices of equivalent size according to the prior art, the homogeneity of the ionic deposit (expressed in terms of variant type) was around +−80% under the same conditions.

Advantage of the Invention Compared to the Prior Art

It is ascertained that the devices (1) according to the present invention enable the flow of ions opposite the active face plane of a receptor electrode (ER) to be homogenised.

Likewise, it is determined that the devices (1) according to the present invention enable a multitude of aerosol particles (such as dust, bio-aerosols or specific molecules, . . . ) within a moving fluid, to be subjected to the action of an ionic flow originating from the corona discharge electrode (EC), whereof the overall intensity inside any flow vein situated inside the tube (25) is quasi-homogeneous when passing through the tube.

It is also determined that the devices (1) according to the present invention enable a quasi-homogeneous quantity of ions ($i^q$) to be deposited on the surface of this multitude of aerosol particles (belonging to the same class of diameters).

It is also ascertained that the devices (1) according to the invention enable the efficacy of the flow of ions ($i^q$) to increase in the direction of the electrode (ER) and thus in the direction of the flow veins, by reducing the radial less efficacious and inhomogeneous flow in the direction of the wall (26) of the tube (25).

It is finally determined that bi-ionic systems (111) according to the invention allow a homogeneous quantity of ions of opposite signs ($i^{q1}$, $i^{q2}$) to be deposited on the surface of the particles.

INDUSTRIAL APPLICATIONS OF THE INVENTION

The invention finds industrial applications in numerous fields, especially physical, chemical, energetic, biological where it is appropriate to deposit a homogeneous quantity of ions on the aerosol particles, with a view to imparting them with a reduced physical and quasi-uniform effect.

An immediate application concerns the field of electrostatic painting. Other applications are evident in the field of electrostatic filtration, such that all the particles passing through an electrostatic filter is quasi-uniformly precharged. The inventors have implemented the invention in the field of biology to subject the external wall of micro-organisms to a reduced energetic action quasi-homogeneously modifying their structure and their internal configuration.

Although the above description contains numerous specifics, they do not have to be considered as limiting the object of the invention, but as offering illustrations of certain of the preferred modes of implementation of the invention.

The scope of the invention must be considered in relation to the claims hereinafter and their legal equivalents, rather than by the examples mentioned hereinabove.

The invention claimed is:

1. An ionic emission electrostatic device (1) for depositing on the surface (sp) of a multitude of aerosol particles (p1, p2, pn) within a fluid (F), of the same class of diameter (dp), a quasi-homogeneous quantity of ions ($i^q$) of a charge (q), said electrostatic device (1) comprising:
   a) a conductive discharge corona electrode (EC), subjected to an electric discharge potential (V1), emitting an overall flow (I) of ions ($i^q$),
   b) a non-corona conductive receptor electrode (ER), subjected to an electric receptor potential (V2),
      exhibiting a pseudo-planar active face (SA), located opposite the corona electrode (EC) and at a distance (di) from the discharge zone (D),
      and whose free space (H) separating the active face (SA) from the corona electrode (EC) is free,
   c) a multitude of through channels of fluid (C1, C2, . . . , Cn),
      passing through the receptor electrode (ER),
      terminating in a multitude of orifices (O1, O2, . . . On) quasi-circular in form, on its active face (SA), according to a flow axis (xx'), substantially perpendicular to the active face (SA), ensuring, in the vicinity of the active face (SA), a flow of fluid (F) according to veins passing through the receptor electrode (ER) and overall substantially parallel to the axis (xx') of flow (K) of fluid (F), d) means (2) for pressurizing the fluid, ensuring movement of the fluid (F) especially via the thickness (cr) of the receptor electrode (ER), substantially in said flow axis (xx'), and along said veins (30), e) a source of electric current (3) comprising at least two metallic terminals (B+, B−) having a sufficiently high electric potential difference between them (of the order of 5000V), f) at least two conductors (4, 5), each connected at one end (6, 7) to one of the potential terminals (B+, B−) and/or to earth (8), and at the other end (9, 10) respectively to a difference of the corona electrode (EC) and receptor electrode (ER), to subject the two electrodes (EC, ER) to a difference in electric potential (V1)< >(V2) sufficient to ensure the ionic emission of ions ($i^q$) in the discharge zone (D), said ionic emission electrostatic device (1) being characterised in that in combination:

on the one hand, the pseudo-planar active face (SA) of its receptor electrode (ER) is covered by a quasi-uniformly distributed plurality of craters (43) with sharp edges, in a closed pseudo circle (44), exhibiting on their end edges (Al) a section of minimum bend radius (ra), enclosing the orifices (O1, O2, . . . On), and terminating towards the outside of the active face (SA), according to a substantially perpendicular axis (xx'), in the direction of the discharge zone (D), on the other hand these craters (43) with sharp edges, in a closed pseudo circle (44), are arranged on the receptor electrode (ER) such that the multitude of orifices (O1, O2, . . . On) of the through channels (C1, C2, . . . ,Cn) of fluid (F) is distributed quasi-uniformly on the active face (SA), in its two geometric directions (yy', zz'), so as to establish a surface flow (Is (r)) of ions ($i^q$) originating from the corona electrode (EC) in the direction of the pseudo-planar active face (SA) of the receptor electrode (ER), having an ionic punctual surface intensity J(Q(r)) exhibiting at points Q(r) adjacent to the active face (SA) spatial distribution of ionic intensity (Is (r)) at increased homogeneity, relative to the variation of spatial distance (r) between:

the corresponding projection point (P(r)) of the active face (SA) of the receptor electrode (ER), and the main ionic action zone (A) surrounding the geometric centre (0) of the figure (G) of the straight projection of the discharge zone (D) of the corona electrode (EC) on the pseudo-planar active face (SA), in a wide effective zone (S) surrounding the geometric centre (O); such that in this effective zone (S) a quasi uniform quantity of ions ($i^q$) is deposited on the surface (sp) of aerosol particles (p1, p2, . . . , pn) of the same class of diameter (dp) transported by the fluid (F) via the orifices (O1, O2, . . . , On).

2. The ionic emission electrostatic device (1) as claimed in claim 1, characterised in that in combination:

its discharge electrode (EC) is constituted by a corona point (22), placed at the end of a needle (23), oriented according to a point axis (xi, x'l) perpendicular to the pseudo-planar active face (SA), in the direction of the sharpened emerging zones (Ai) of the craters (43) with sharp edges, in a closed pseudo circle (44), and positioned at a distance (di) opposite the active face (SA).

3. The ionic emission electrostatic device (1) as claimed in claim 2, characterised in that also, in combination:

its corona point (22) electrode (EC) is enclosed by a hollow tube (25) of minimal wall thickness (26), colinear to the point axis (xl, x'l) of the needle (23), according to the flow axis (xx') of fluid (F), and situated opposite the active face (SA) of the receptor electrode (ER), this hollow tube (24) longitudinally contains veins for fluid (F) opposite the active face (SA) and around the needle (23).

4. The ionic emission electrostatic device (1) as claimed in claim 3 characterised in that also, in combination:

its corona point (21) electrode (EC) is surrounded by a hollow tube (25) of minimum wall thickness (26) constituted by a conductive material, especially metallic (34), and this hollow tube (25) is carried at the same electric potential (V2) of the receptor electrode (ER), to give electric protection vis-a-vis the potential (V1) of the corona electrode (EC), while limiting the flow of radial ions perpendicular to the point axis (xl, x'l), due to the preponderant electrostatic action of the points (Ai) (sharp-edged and/or spiky) of the active face (SA).

5. The ionic emission electrostatic device (1) as claimed in claim 1, characterised in that in combination:

its receptor electrode (ER) is constituted by a porous structure (51), with alveolar mesh (52) constituted by an array assembly of fins (an) with longilinear portions (57), and the plurality of its zones sharpened into points (sharp-edged and/or spiky) (Ai) distributed quasi-uniformly on the active face (SA) is caused by dividing the structure of alveolar mesh (52) of the porous structure (51) to the right of the active face (SA).

6. The ionic emission electrostatic device (1) as claimed in claim 5 characterised in that in combination:

its receptor electrode (ER) supporting the pseudo-planar active face (SA) is created by means of a conductive porous block (55), constituted by a pseudo repetitive porous structure (51) with alveolar mesh (52) formed by a plurality of fins (an, . . . ) with longilinear portions (57), constituted by a conductive material (58), especially metallic, whereof the fins (an) have a fine transverse section (St), having a thickness (ca) far less than their longitudinal dimension (la), and comprise at least a lateral leading edge (bn) elongated and tapered (that is, with a minimum local transverse bend radius (ra)) oriented in the direction (xn, x'n) of the length of the fins (an), whereof the fins ( . . . a13, a14, a15, . . . , an, . . . ) are physically and electrically interconnected by each of their ends (cn1, cn2 ) to constitute a conductive three-dimensional array (R'xyz), and are linked and grouped geometrically to constitute a multiplicity of elementary cells ( . . . , c1, . . . , c16, c17, . . . ), communicating between one another to form through channels (C1, C2, . . . , Cn) of fluid (F), whereof the internal fins (a13) of the porous block (55) are predominantly common to several elementary cells (c1 . . . , c16, c17 . . . ), whereof the majority of the linked fins (a13, a14, . . . ) belonging to the same internal cell (c1) of the porous block (55) surround and join tangentially, by at least one of their lateral longitudinal faces (s1), an internal virtual elementary surface (62, 63) to each elementary cell (c1, c17), of closed geometry, to contain a compact elementary empty cellular volume (59, 60), that is, having transverse dimensions (dx1, dy1, dz1) of the same order of magnitude in the three directions (x, y, z), whereof the elementary empty cellular volume (59) of the majority of cells (c1) situated at the centre of the porous block (55) terminates opposite the elementary empty volumes (. . . , 60, . . .) of neighbouring cells (c16, c17, . . .) by at least four recesses (c16) via their elementary surface (62), whereof each of the craters (c16) is surrounded by the lateral edge (b16, . . . ) of fins (. . . , a16, . . . ) belonging to its cell (c16) and common to the neighbouring cells (. . . , c1, . . . ), and the porous block (55) is cut pseudo-planar according to a so-called active face (SA) by dividing a multitude of elementary cells (cA) of the external wall of the three-dimensional array (R'xyz), distributed on the active face (SA), and thus arranging to the right of each divided external cell (cA) a multitude of metallic nozzles (71), exhibiting sharp edges (72) of substantially circular form opposite the active face (SA).

7. The ionic emission electrostatic device (1) as claimed in claim 1, whereof the non-corona conductive receptor electrode (ER) is constituted by a substantially plane plate (64) exhibiting:

two substantially parallel pseudo-planar lateral faces (SA, S'A), a first so-called active face (SA), located opposite the corona electrode (EC) and at a distance (di) from its discharge zone (D), and a second face (S'A), a multitude of fluid through channels (C1, C2, . . . , Cn), passing through the receptor electrode (ER, 64), connecting each of the two faces (SA) and (S'A) of the receptor electrode (ER), terminating in a multitude of orifices (O1, 02, On) on the first active face (SA), according to a so-called flow axis (xx') substantially perpendicular to the first active face (SA), and terminating in a multitude of orifices (O'1, O'2, . . . , O'n) on the second face (S'A), according to an axis (xx') substantially perpendicular to the second face (S'A), said ionic emission electrostatic device (90) being characterised in that in combination:

the multitude of through channels (C1, C2, . . . , Cn) of fluid (F) are placed across the receptor electrode (ER) such that the multitude of orifices (O1, O2, . . . On) is distributed quasi-uniformly on the first active face (SA), and that the multitude of orifices (O'1, O'2, . . . , O'n) is likewise distributed quasi-uniformly on the second active face (S'A)

and the two pseudo-planar active faces (SA, S'A) of the receptor electrode (ER) are each covered by a plurality of zones sharpened into points (sharp-edged and/or spiky) (Ai, A'i)

emerging in relief, some (Ai) from the active face (SA), and others (A'i) from the active face (S'A), exhibiting locally a minimum surface bend radius (ra), distributed quasi-uniformly on the first active face (SA) and on the second active face (S'A), and surrounding said orifices (O1, O2, . . . , On), (O'1, O'2, . . . , O'n).

8. The ionic emission electrostatic device (1) as claimed in claim 6, characterised in that in combination:

its receptor electrode (ER) is constituted by a porous structure (51) with alveolar mesh (52), constituted by an array assembly of fins (an) with longilinear portions (57), the plurality of its zones sharpened into points (sharp-edged and/or spiky) (Ai) distributed quasi-uniformly on the first active face (SA) are caused by dividing the structure of alveolar mesh (52) of the porous structure (51) to the right of the first active face (SA), the plurality of its zones sharpened into points (sharp-edged and/or spiky) (A'i) distributed quasi-uniformly on the second active face (S'A) are caused by dividing the structure of alveolar mesh (52) of the porous structure (51) to the right of the second active face (S'A).

9. A bi-ionic emission electrostatic system (111) for depositing on the surface (sp) of the same class of diameter (dp) of a multitude of aerosol particles (p1, p2, . . . ) within a fluid (F), a quasi-homogeneous quantity for each sign of ions ($i^{q1}$) and ($i^{q2}$) of opposite charges, this bi-ionic electrostatic system (111) being constituted characteristically by the combination of two ionic emission electrostatic devices (101,102) according to claim 1:

arranged in series according to a common flow 10 (K) axis (xx') of fluid (F), and whereof the signs of polarity of the couples (V11, V12) and (V21, V22) corresponding to:

the electric potential of the conductive corona electrodes (EC, EC2), and an electric potential of the conductive non-corona receptor electrodes (ER1, ER2), of each of the two electrostatic devices (101,102) are inverse.

10. The bi-ionic emission electrostatic system (111) according to claim 9 for depositing on the surface (sp) of the same class of diameter (dp) of a multitude of aerosol particles (p1, p2, pn) within a fluid (F), a quasi-homogeneous quantity, for each sign, of ions ($i^{q1}$) and ($i^{q2}$) of opposite charges, this bi-ionic electrostatic system (111) being constituted characteristically by the combination of two ionic emission electrostatic devices (101,102) having inverse polarity and constituted by the characteristic combination between:

three conductive non-corona receptor electrodes (ER1, ER2, ER3) arranged in series, operated at varying electric potentials (V21, V22, V23), each exhibiting:

two substantially parallel pseudo-planar lateral faces: a first face (SA1, SA2, SA3) and a second face (S'A1, S'A2, S'A3), a multitude of through channels for fluid (C1i, C2i, . . . Cni) with ($1<=i<=3$), passing through each of the receptor electrodes (ERi) with ($1<=i<=3$), connecting each of the two faces (SAi) and (S'Ai) of each receptor electrode (ERi) with ($1<=i<=3$), terminating in a multitude of orifices (O1i, 02i, . . . , Oni) of quasi-circular form, on the first active face (SA), according to an axis (xx') perpendicular to the first corresponding active face (SAi), with ($1=i<=3$), and terminating in a multitude of orifices (O'1, O'2, . . . , 0'n) of quasi-circular form, on the second face (S'Ai), according to an axis (xx') substantially perpendicular to the second face (S'Ai), with ($1<=i<=3$), at least two conductive corona discharge electrodes (EC1, EC2), subjected to an electric discharge potential (V11, V12) alternatively positive or negative, emitting an overall flow (I1) of ions ($i^{q1}$), and (I2) of ions ($i^{q2}$) of opposite signs, whereof the corona electrode (EC1) is placed between the first couple or receptor electrodes (ER1, ER2), and whereof the discharge zone is situated opposite the active face (SA1) of one (ER1) of the two receptor electrodes (ER1, ER2) of the first pair, and whereof the second corona electrode (EC2) is placed between the first pair of receptor electrodes (ER2, ER3), and whereof the discharge zone is situated opposite the active face (SA2) of one (ER2) of the two receptor electrodes (ER2, ER3) of the first pair, said bi-ionic emission electrostatic system (111) being characterised in that in combination:

the multitude of through channels (C1i, C2i, ..., Cni) with (1<=i<=3) of each receptor electrode (ERi) is placed across the receptor electrode (ERi) such that the multitude of orifices (O1i, O2i, ..., Oni) is distributed quasi-uniformly in the two directions (yy', zz') on the first active face (SAi), and the multitude of orifices (O'1i, O'2i, ,O'ni) is distributed quasi-uniformly on the second active face (S'Ai) in the two directions (yy', zz'), and the two pseudo-planar faces (SA2, S'A2) of the central receptor electrode (ER2) are each covered by a plurality of zones sharpened into points (sharp-edged and/or spiky) (A2, A'2), emerging in relief some (A2) of the first (SA2), and others (A'2) of the second active face (SA'2) presenting locally a minimum surface bend radius (ra), distributed quasi-uniformly in the two directions (yy', zz'), on the first face (SA2) and surrounding the corresponding orifices (On2), as well as on the second face (S'A2) and surrounding the corresponding orifices (O'n2).

11. The ionic emission electrostatic system (131) according to claim 3, constituted by the characteristic combination in parallel of a plurality of ionic emission electrostatic devices (123, 124,125) disposed side by side transversally relative to the overall flow axis (xx') of fluid (F), and whereof the signs of polarity of the couples (Vi, V'i, V"i) and (V2, V'2, V41 2) corresponding to:

the electric potential of the conductive corona electrodes (EC1, EC'1, EC41 1), and the electric potential of the conductive non-corona receptor electrodes (ER1, ER'1,ER41 1), of each of the two electrostatic devices (123, 124, 125) are similar.

12. The ionic emission electrostatic system (131) according to claim 11, constituted by the combination in parallel of the plurality of ionic emission electrostatic devices (123, 124,125) said system being characterised in that the receptor electrodes (ER1, ER'1, ER"1) of the plurality of electrostatic devices (123, 124, 125) constituting it are made from a common porous plate (64) constituted by an array (R'xyz) of fins (an) situated transversally to the axis (xx') of flow (F).

* * * * *